(12) United States Patent
Kaga et al.

(10) Patent No.: US 7,236,291 B2
(45) Date of Patent: Jun. 26, 2007

(54) PARTICLE USE FOR IMAGE DISPLAY MEDIA, IMAGE DISPLAY PANEL USING THE PARTICLES, AND IMAGE DISPLAY DEVICE

(75) Inventors: Norihiko Kaga, Kodaira (JP); Gaku Yakushiji, Higashiyamato (JP); Hare Tazawa, Kodaira (JP); Maki Masutani, Tokorozawa (JP); Taichi Kobayashi, Kodaira (JP); Toshiaki Arai, Funabashi (JP); Kazuya Murata, Hino (JP); Ryo Sakurai, Kokubunji (JP); Yoneji Kobayashi, Kodaira (JP); Hajime Tamura, Kawasaki (JP); Hiroyuki Anzai, Mitaka (JP); Hirotaka Yamazaki, Kunitachi (JP); Yoichi Nishimuro, Kodaira (JP); Kunio Machida, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/552,283

(22) PCT Filed: Apr. 2, 2004

(86) PCT No.: PCT/JP2004/004854

§ 371 (c)(1),
(2), (4) Date: Oct. 3, 2005

(87) PCT Pub. No.: WO2004/090626

PCT Pub. Date: Oct. 21, 2004

(65) Prior Publication Data

US 2006/0146394 A1 Jul. 6, 2006

(30) Foreign Application Priority Data

| Apr. 2, 2003 | (JP) | ............................. 2003-099342 |
| Apr. 7, 2003 | (JP) | ............................. 2003-102764 |
| Apr. 16, 2003 | (JP) | ............................. 2003-111516 |
| May 28, 2003 | (JP) | ............................. 2003-150712 |
| Jun. 10, 2003 | (JP) | ............................. 2003-165353 |
| Jun. 26, 2003 | (JP) | ............................. 2003-183023 |
| Jun. 27, 2003 | (JP) | ............................. 2003-185243 |
| Jul. 1, 2003 | (JP) | ............................. 2003-189304 |
| Jul. 18, 2003 | (JP) | ............................. 2003-199076 |
| Nov. 11, 2003 | (JP) | ............................. 2003-380679 |

(51) Int. Cl.
*G02B 26/00* (2006.01)

(52) U.S. Cl. ...................... 359/296; 345/107

(58) Field of Classification Search ............... 359/295, 359/296; 345/105, 84; 430/126
See application file for complete search history.

(56) References Cited

U.S. PATENT DOCUMENTS 5,189,337 A * 2/1993 Endo et al. ................. 313/479
2002/0050976 A1 * 5/2002 Yamaguchi et al. ........ 345/105

FOREIGN PATENT DOCUMENTS

JP 2002-139750 A 5/2002
JP 2002-236471 A 8/2002

* cited by examiner

*Primary Examiner*—Timothy Thompson
*Assistant Examiner*—Jerry Fang
(74) *Attorney, Agent, or Firm*—Sughrue Mion, PLLC

(57) ABSTRACT

An image display device, in which image display media are sealed between opposed substrates, at least one of two substrates being transparent, and in which the image display media, to which an electrostatic field is applied, are made to move so as to display an image. A construction of particles used as the image display media is improved (the first, second, fourth, fifth, sixth, eighth and ninth aspects of the invention), and a material of the particles used as the image display media is improved (the third, seventh and tenth aspects of the invention). Whiteness of the particles and a liquid powder using the particles is improved, particle agglutination is prevented, and the charge property is controlled. Moreover, durability is improved such that a contrast of the image display during a repetition display is not decreased. As a result, an excellent image display can be achieved.

11 Claims, 10 Drawing Sheets

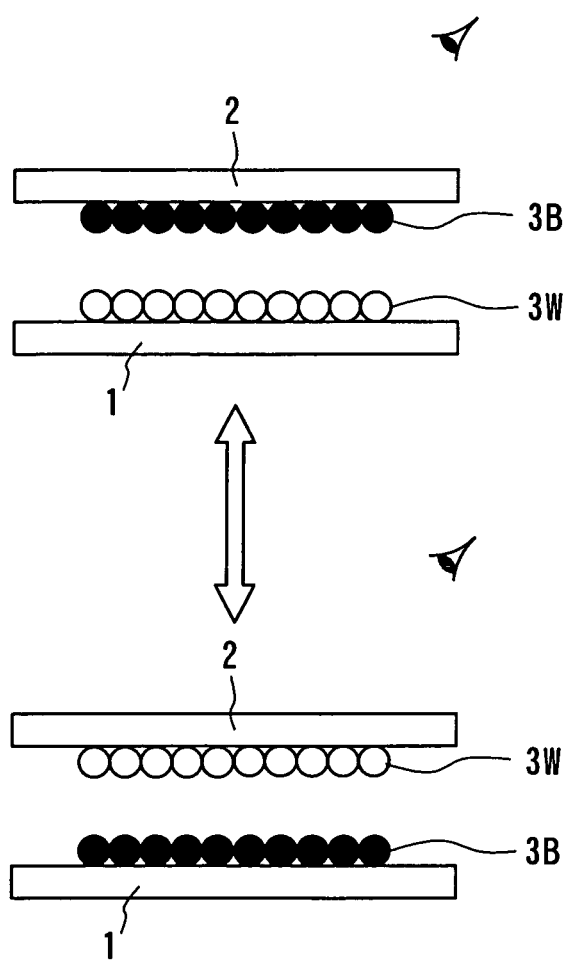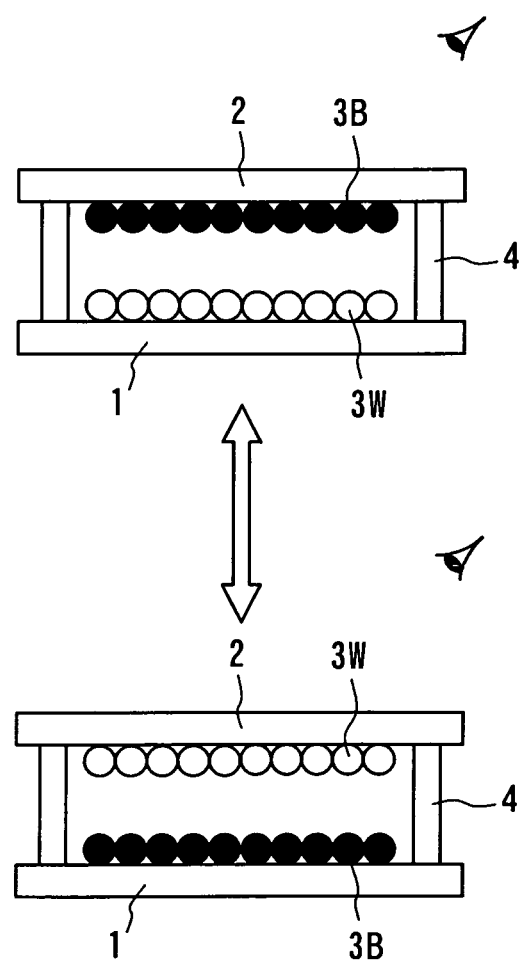

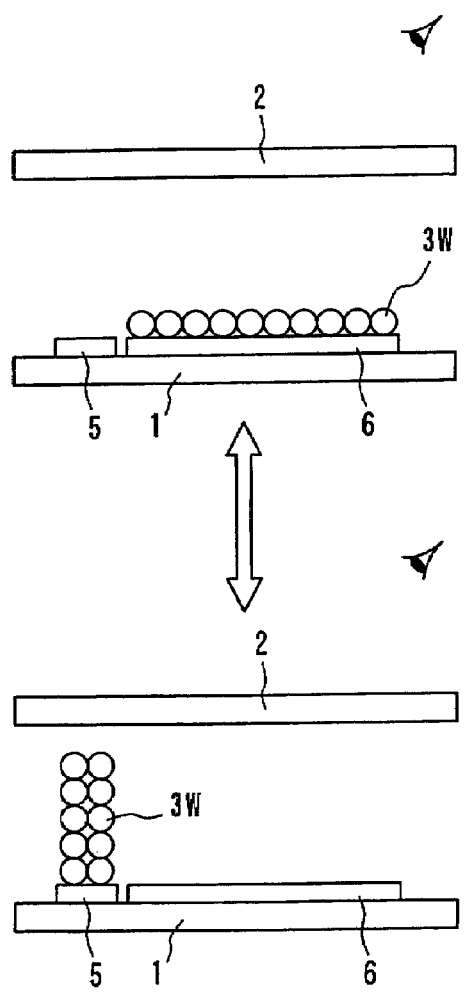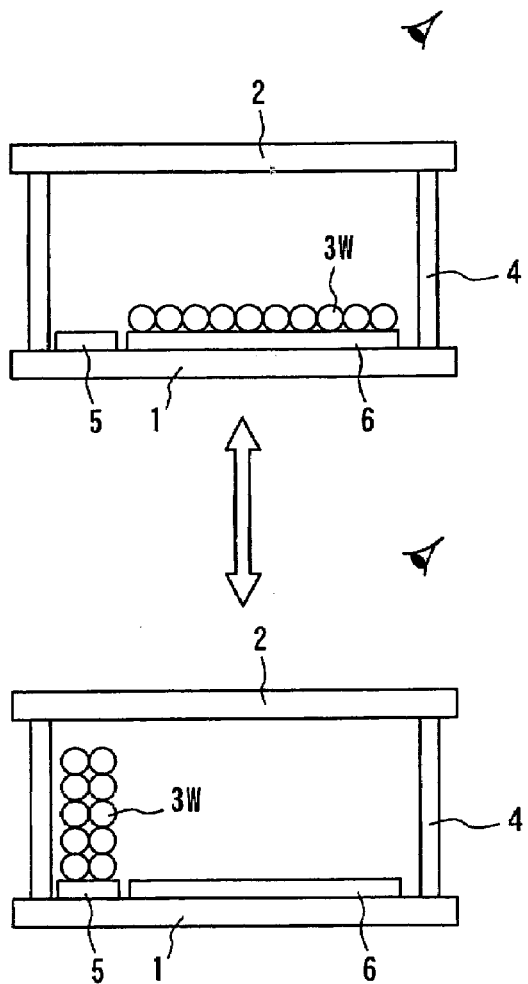

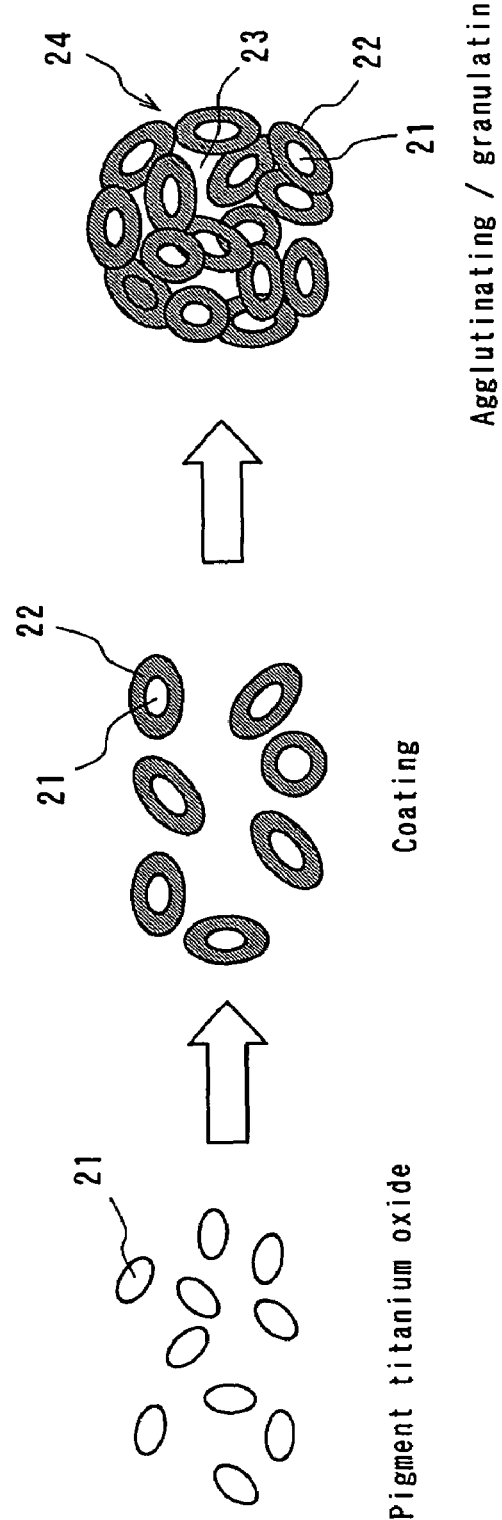

3B  3W 3B  3W 3B  3W 3W  3B 3B  3W 3W  3W

PARTICLE USE FOR IMAGE DISPLAY MEDIA, IMAGE DISPLAY PANEL USING THE PARTICLES, AND IMAGE DISPLAY DEVICE

TECHNICAL FIELD

The present invention relates to particles, liquid powder used for a reversible image display device enables to repeatedly display images accompanied by flight and movement of particles or liquid powder utilizing Coulomb's force, an image display panel using the particles or the liquid powder and an image display device.

BACKGROUND ART

As an image display device substitutable for liquid crystal display (LCD), image display devices with the use of technology such as an electrophoresis method, an electrochromic method, a thermal method, dichroic-particles-rotary method are proposed. As for these image display device, it is conceivable as inexpensive visual display device of the next generation from a merit having wide field of vision close to normal printed matter, having smaller consumption with LCD, spreading out to a display for portable device, and an electronic paper is expected.

Recently, electrophoresis method is proposed that microencapsulate dispersion liquid made up with dispersion particles and coloration solution and dispose the liquid between faced substrates. However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21–23, 1999) Transaction Pages 249–252] However, the structure becomes complicated because the charge transport layer and further a charge generation layer are to be arranged. In addition, it is difficult to constantly dissipate charges from the electro-conductive particles, and thus there is a drawback on the lack of stability.

In order to solve the problems mentioned above, as an image display device enabling rapid response due to a dry-type device, simple construction, inexpensive cost and excellent stability, it is known a dry-type image display device which comprises an image display panel, in which two groups of particles or liquid powders having different colors and different charge characteristics are sealed between a transparent substrate and an opposed substrate, and, in which the particles or the liquid powders, to which an electrostatic field produced by two electrodes having different potentials is applied, are made to move so as to display an image. In the image display device, image display elements are formed by arranging partition walls between the transparent substrate and the opposed substrate.

However, the following tasks arise.

<Tasks of a First Aspect of the Invention>

In the dry-type image display device mentioned above, there is an advantage such that a particle moving resistance is small and a response speed is rapid with respect to the electrophoresis method. A theory of the image display on the dry-type image display device mentioned above is that a pattern is recognized by obtaining a contrast of respective particles. Therefore, it is important to control a luminance factor of white particles, which are a base for reflecting a light. Generally, the white particles are produced by mixing fine particles made of a material having high refraction index into a material having low refraction index. In this case, if the number of the white particles is small. An opacifying rate becomes insufficient, and thus there is a limit for an achievable luminance factor.

<Tasks of a Second Aspect of the Invention>

In the dry-type image display panel mentioned above, there occurs a phenomenon such that the sealed particles do not move after a repetition use because of particle adhesions with each other. Therefore, there occurs a problem such that an image contrast is deteriorated, and thus a durability after the repetition use is insufficient.

<Tasks of a Third Aspect of the Invention>

In the dry-type image display panel mentioned above, as a particle behavior between the substrates each having an actual electrode, it is a common phenomenon that all the particles having the same charge characteristics are not adhered evenly to one electrode surface but they sometimes generate an agglutinated cluster between the substrates. In this case, the number of the particles adhered to a display electrode surface becomes small, and thus there occurs a problem such that a display performance is extremely deteriorated.

In the case of the agglutinated cluster generated by the particles having different charge characteristics, it is relatively easy to crush the agglutinated cluster by making an electric field intensity larger, since the agglutination occurs due to Coulomb's force etc. between two particles. However, it is difficult to crush the agglutinated cluster in the same manner if the agglutinated cluster is formed by the particles having the same charge characteristics. In this case, it is not possible to crush the agglutinated cluster by en external electronic stress, and thus a solving method is not certain.

<Tasks of the Fourth Aspect of the Invention>

In the dry-type image display device mentioned above, there is an advantage such that a particle moving resistance is small and a response speed is rapid with respect to the electrophoresis method. A theory of the image display on the dry-type image display device mentioned above is that a pattern is recognized by obtaining a contrast of respective particles. Therefore, it is important to control a color of the white particles which are a base for emitting a color.

Heretofore, as coloring particles such as white particles and so on, use is made of: crushed particles obtained by mixing pigment and dye into a polymer and crushing/classifying the mixed polymer; polymerized particles obtained by involving the pigment and dye by means of a polymerization method such as suspension polymerization, emulsification polymerization and seed polymerization and so on; and composite particles in which the pigment and dye and so on are adhered to a surface of mother particles. However, in the crushed particles, there are problems: such that a desired color is not obtained since a particle shape is varied and there is a limit for filling amounts of the pigment and dye; and such that the particles have a damage such that a crack generation and so on when crushed. Moreover, in the polymerized particles, there is a problem such that filling amounts of the pigment and dye become further smaller and thus a desired color is not obtained. Further, in the composite particles, there are problems: such that a coloring is insufficient since the pigment and dye are not existent in the mother particles; such that the pigment and dye are easily picked away from the surface; and such that manufacturing processes are made larger.

<Tasks of a Fifth Aspect of the Invention>

In the dry-type image display panel mentioned above, there occurs a phenomenon such that the sealed particles do not move after a repetition use because of particle adhesions with each other. Therefore, there occurs a problem such that an image contrast is deteriorated, and thus a durability after the repetition use is insufficient.

<Tasks of a Sixth Aspect of the Invention>

In the dry-type image display device mentioned above, there is an advantage such that a particle moving resistance is small and a response speed is rapid with respect to the electrophoresis method. A theory of the image display on the dry-type image display device mentioned above is that a pattern is recognized by obtaining a contrast of respective particles. Therefore, it is important to control a color of the white particles which are a base for emitting a color.

Heretofore, the white particles mentioned above are manufactured by filling white pigment such as titanium oxide ($TiO_2$), zinc oxide, zirconium oxide and so on into a base resin. As a manufacturing method, use is made of a polymerization method and a mixing/crushing method. In the mixing/crushing method, a larger amount of the pigment such as titanium oxide can be added, and thus an excellent whiteness can be obtained. As a shape, circular particles can be obtained in the polymerization method, but the particles have an indefinite shape in the mixing/crushing method. As filling amounts of the white pigment, 50 parts by weight of the white pigment is maximum in the polymerization method with respect to 100 parts by weight of the base resin, but it is possible to fill about 300 parts by weight of the white pigment in the mixing/crushing method with respect to 100 parts by weight of the base resin. As mentioned above, the polymerization method and the mixing/crushing method have good and bad points respectively, but the mixing/crushing method is preferably used from a viewpoint of the most important whiteness.

However, in the mixing/crushing method, if titanium oxide is added more and more to a high extent, a scattering becomes insufficient and thus there is a problem such that a white refraction index decreases. For example, the whiteness becomes maximum at about 200 parts by weight of titanium oxide with respect to 100 parts by weight of the base resin. Then, if titanium oxide is added over 300 parts by weight, it is difficult to perform a mixing process and the white refraction index also decreases. Particularly, in the case of using titanium oxide, there is a problem such that it is difficult to fill over 300 parts by weight of titanium oxide with respect to 100 parts by weight of the base resin.

<Tasks of a Seventh Aspect of the Invention>

As one example of the particles used in the image display device comprising the dry-type image display panel, heretofore, there is a case such that use is made of the particles obtained by: melting pigment, charge control agents and so on with respect to a base resin made of a thermoplastic resin such as polycarbonate (PC) and so on; and mixing/crushing the melted base resin. The particles obtained by the mixing/crushing method using the thermoplastic resin as the base resin in the manner mentioned above have a low heat resistance. Therefore, there is a problem such that the particles are melted and thus adhered/agglutinated to the image display panel during the use of the image display panel under a high temperature or during the works under a high temperature such as a substrate stacking process of the image display panel.

<Tasks of an Eighth Aspect of the Invention>

In the dry-type image display panel mentioned above, an image contrast is not still sufficient, and there occurs a phenomenon such that the sealed particles do not move after a repetition use because of particle adhesions with each other. Therefore, there occurs a problem such that an image contrast is deteriorated, and thus a durability after the repetition use is insufficient.

<Tasks of a Ninth Aspect of the Invention>

In the dry-type image display panel mentioned above, an image contrast is not still sufficient, and there occurs a phenomenon such that the sealed particles do not move after a repetition use because of particle adhesions with each other. Therefore, there occurs a problem such that an image contrast is deteriorated, and thus a durability after the repetition use is insufficient.

<Tasks of a Tenth Aspect of the Invention>

Heretofore, it is not possible to control charge characteristics (positive charge performance and negative charge performance) of a particle material constituting image display media using the image display device having the dry-type image display panel, and the charge characteristics are a value inherent from a resin material constituting the image display media itself.

DISCLOSURE OF INVENTION

<Disclosure of a First Aspect of the Invention>

An object of the first aspect of the invention is to eliminate the drawbacks mentioned above and to provide white particles used as image display media and an image display device utilizing the white particles, wherein a light transmitted through a thin image display media layer is decreased and thus it is possible to improve a luminance factor of a white color by making a back scattering larger.

According to the first aspect of the invention, white particles used for image display media in an image display device, in which the image display media are sealed between opposed substrates, at least one of two substrates being transparent, and in which the image display media, to which an electrostatic field is applied, are made to move so as to display an image, are characterized in that the white particle comprises a center portion and an outer portion coating the center portion, wherein the center portion has a total reflectance of not less that 70% at a boundary between the center portion and the outer portion, and, wherein the outer portion is formed by at least one resin layer, in which fine particles made of a high reflectance material are mixed with a low reflectance material. In the white particles according to the invention, since the white particles have the center portion showing a high total reflection rate, it is possible to improve a luminance factor of the white color.

As preferred embodiments of the white particles according to the first aspect of the invention, there are cases: such that the center portion is a solid metal particle or a hollow metal particle; such that the center portion is a particle in which a metal film is coated on the resin layer; such that the boundary between the center portion and the outer portion is a reflection film formed by a multi-layer film; such that a diameter of the center portion is 50–95% with respect to a particle diameter; such that an average particle diameter d(0.5) is 0.1–50 µm; such that the resin layer of the outer portion has a surface of the outer portion has a surface to which a coupling agent treatment is performed; and such that the resin layer of the outer portion has a surface coated by a transparent resin having a strong electrostatic property. In all the cases mentioned above, it is possible to further improve a luminance factor of the white color by specifying the constructions.

Moreover, according to the first aspect of the invention, an image display device, in which the image display media are sealed between opposed substrates, at least one of two substrates being transparent, and in which the image display media, to which an electrostatic filed is applied, are made to move so as to display an image, is characterized in that, as at least one group of the image display media, use is made of the white particles mentioned above.

<Disclosure of a Second Aspect of the Invention>

An object of the second aspect of the invention is to eliminate the drawbacks mentioned above and to provide an image display panel and an image display device, wherein a durability during a repetition use is excellent and a cost is inexpensive.

According to the second aspect of the invention, particles used for an image display media, are characterized in that: in an image display panel, in which at least two groups of image display media having different colors and different charge characteristics are sealed between opposed substrates, at least one of two substrates being transparent, and in which the image display media, to which an electrostatic filed is applied, are made to move so as to display an image; at least two groups of the image display media having different colors and different charge characteristics are constructed by at least three groups of particles including two groups of substantially circular particles having different color and different charge characteristics and third particles having a diameter smaller than that of the two groups of substantially circular particles.

In the image display panel according to the second aspect of the invention, since use is made of the image display panel in which three groups of the particles produced by adding the third particles to the two groups of the substantially circular particles having different charge characteristics are sealed between two substrates, the particles become difficult to be agglutinated and adhered with each other and it is possible to improve a durability of the image display. In this case, since the third particles are formed by particles (fine particles) smaller than the other two groups of the particles, the third particles are always existent near the surface of one of the two groups of the particles (a weak adhesion due to an electric attraction force). As a result, a direct contact between the first particles and the second particles, which are easy to be agglutinated with each other due to the different charge characteristics, is prevented by the third particles, and thus it is possible to prevent the particle agglutination.

Moreover, it is preferred that the two groups of the substantially circular particles have a circular shape and a surface of them is macroscopically smooth. If the surface of the particles is not macroscopically smooth or the shape of the particles is not circular, a rolling function of the third particles becomes difficult to occur and a lubrication effect becomes difficult to be exerted, so that it is easy to generate the particle agglutination. Further, it is preferred that the third particles have a circular shape. If the third particles have a circular shape, a rolling function between the other two particles are further exerted and the first particles and the second particles are easy to move (due to an increase of the lubrication effect between the two particles), so that an effect of preventing the agglutination between the two particles is increased.

As the other preferred embodiments, there are cases: such that the two groups of substantially circular particles having different colors and different charge characteristics have an average particle diameter in a range of 0.5–50 µm and have substantially same average particle diameter with each other; such that an average particle diameter of the third particles is 20–200 nm; and such that at least two groups of the image display media filled between the substrates have a volume occupying rate in a range of 5–70 vol %. In all the cases, it is possible to further perform the present invention effectively.

Moreover, according to the second aspect of the invention, an image display device is characterized in that the image display panel mentioned above is installed.

<Disclosure of a Third Aspect of the Invention>

An object of the third aspect of the invention is to eliminate the drawbacks mentioned above and to provide image display media and an image display device using the image display media, wherein a generation of agglutinated cluster due to the particles having the same charge characteristics can be reduced.

According to the third aspect of the invention, particles used for image display media of an image display device, in which at least two groups of the image display media having charge characteristics and made of color particles are sealed between opposed substrates, at least one of two substrates being transparent, and in which the image display media, to which an electrostatic field generated between two electrodes having different potentials is applied, are made to move so as to display an image, are characterized in that the particles are made of a low dielectric insulation material, or, particles used for image display media of an image display device, in which one group of the image display media having charge characteristics and made of color particles are sealed between opposed substrates, at least one of two substrates being transparent, and in which the image display media, to which an electrostatic field generated between two electrodes having different potentials is applied, are made to move so as to display an image, are characterized in that the particles are made of a low dielectric insulation material. Moreover, according to the invention, an image display device is characterized in that use is made of the particles used for the image display media mentioned above.

As preferred embodiments of the image display media, there are cases: such that the particles have a specific inductive capacity $\in_r$ of $\in_r \leq 5.0$, more preferably $\in_r \leq 3.0$; such that high dielectric filler and conductive filler are not contained in the particles; such that high dielectric material and high conductive material are not adhered to a surface of the particles; such that an average particle diameter of the particles is 0.1–50 µm; and such that a surface charge density of the particles is 5–150 µC/m² in an absolute value. In all the cases, it is possible to perform the present invention more effectively.

Here, it is preferred that the specific inductive capacity $\in_r$ of the particles is $\in_r \leq 5.0$. If the specific inductive capacity $\in_r$ exceeds 5.0, it is not possible to sufficiently prevent the generation of the agglutinated cluster as clearly understood from the examples mentioned below.

In the image display media and the image display device using the image display media according to the invention, since use is made of the image display media constituted by the particles made of a low dielectric insulation material preferably having the specific inductive capacity $\in_r$ of $\in_r \leq 5.0$, it is possible to prevent the generation of the agglutinated cluster of the particles even if they have the same charge characteristics, and thus it is possible to perform an excellent image display.

<Disclosure of a Fourth Aspect of the Invention>

An object of the fourth aspect of the invention is to eliminate the drawbacks mentioned above and to provide white particles which can improve extremely an opacifying rate (reflection rate), an image display media utilizing the particles and an image display device utilizing the panel.

According to the fourth aspect of the invention, white particles used for an image display device, in which image display media are sealed between opposed substrates, at least one of two substrates being transparent, and in which the image display media, to which an electrostatic field is applied, are made to move so as to display an image, are characterized in that the white particles are made of secondary particles produced by agglutinating or granulating primary particles of white pigment coated by a binder, and the white particles have fine bubbles therein.

In the white particles according to the fourth aspect of the invention, since the white pigment preferably titanium oxide, whose surface is coated by a binder, is agglutinated or granulated and a plurality of fine bubbles are introduced therein, it is possible to improve extremely the opacifying rate (reflection rate). Particularly, the opacifying rate of titanium oxide is not increased in relation to a filling amount. According to Mie's theory, a light scattering efficiency of the pigment is decreased in relation to an increase of the filling amount, and the opacifying force indicates a peak at a volume fraction of about 30%. If the filling amount is further increased, it becomes a closest packing state and the opacifying force is improved at once by introducing the fine bubbles. The present invention utilizes this phenomenon.

As preferred embodiments according to the fourth aspect of the invention, there are cases: such that the white pigment is titanium oxide; such that the binder is made of a material having a low refraction index; such that the agglutinating or granulating step of the primary particles is performed by mixing and agitating in a flowing gas current or mechanically so as to introduce a lot of fine bubbles; and such that an average particle diameter d(0.5) is 0.1–50 μm. By selecting a material of the white particles in this manner and by controlling an average particle diameter of the particles in a predetermined range, it is possible to further improve the opacifying force (reflection rate) of the white particles.

Moreover, according to the invention, an image display device, in which image display media are sealed between opposed substrates, at least one of two substrates being transparent, and in which the image display media, to which an electrostatic field is applied, are made to move so as to display an image, is characterized in that, as at least one group of the image display media, use is made of the white particles mentioned above.

<Disclosure of a Fifth Aspect of the Invention>

An object of the fifth aspect of the invention is to eliminate the drawbacks mentioned above and to provide an image display panel and an image display device wherein a durability during a repetition use is excellent and a cost is inexpensive.

According to a first embodiment of the fifth aspect of the invention, particles used for image display media in an image display panel, in which at least two groups of the image display media are sealed between opposed substrates, at least one of two substrates being transparent, and in which the image display media, to which an electrostatic field generated between two electrodes having different potentials is applied, are made to move so as to display an image, are characterized in that one of the two groups of the particles having different charge characteristics and different optical reflectance included in the at least two groups of the image display media has a surface on which macroscopic concavo-convex portion exists, and the other of the two groups of the particles has a surface on which no macroscopic concavo-convex portion exists.

In the image display panel according to the first embodiment of the fifth aspect of the invention, one particles used for two groups of the image display media having different charge characteristics are formed by particles having a surface on which macroscopic concavo-convex portion exists (for example, crushed particles), and the other particles are formed by particles having a surface on which no macroscopic concavo-convex portion exists, so that the surface states of the particles used for two groups of the image display media are made to be different. Therefore, the particles having different charge characteristics become difficult to be agglutinated and adhered with each other, and thus a durability of the image display can be improved. In the case of using the particles having the same charge characteristics, the agglutination between the particles is hardly generated even if they have macroscopically same surfaces, since a repulsive force is effected between the particles. However, even in the case of using the particles having different charge characteristics, in which an attractive force is effected between the particles, it is difficult to agglutinate the particles if then have macroscopically different surfaces.

According to a second embodiment of the fifth aspect of the invention, particles used for image display media in an image display panel, in which at least two groups of the image display media are sealed between opposed substrates, at least one of two substrates being transparent, and in which the image display media, to which an electrostatic field generated between two electrodes having different potentials is applied, are made to move so as to display an image, are characterized in that one of the two groups of the particles having different charge characteristics and different optical reflectance included in the at least two groups of the image display media has a surface on which macroscopic concavo-convex portion exists, and the other of the two groups of the particles has a surface on which no macroscopic concavo-convex portion exists and on which fine particles are adhered in an electrostatic manner.

In the image display panel according to the second embodiment of the fifth aspect of the invention, one particles used for two groups of the image display media having different charge characteristics are formed by particles having a surface on which macroscopic concavo-convex portion exists (for example, crushed particles), and the other particles are formed by particles having a surface on which no macroscopic concavo-convex portion exists. In addition, the fine particles as a third particles having a charge characteristic different from that of the particles, on which no macroscopic concavo-convex portion exists, are adhered in an electrostatic manner to the surface of the substantially circular particles on which no macroscopic concavo-convex portion exists. Therefore, not only the particles having different charge characteristics but also the particles having the same charge characteristics become difficult to be agglutinated and adhered with each other, and thus a durability of the image display can be improved. That is, in the case of using the particles having the same charge characteristics, a repulsive force is effected between the particles, but the agglutination between the particles is easily generated if they have the surfaces on which no macroscopic concavo-convex portion exists. However, even in the case of using the particles having the same charge characteristics and having the surfaces on which no macroscopic concavo-convex portion exists, the agglutination between the particles can be prevented certainly if the fine particles are adhered in an electrostatic manner thereon. Then, in the case of using the particles having different charge characteristics, it is difficult to agglutinate the particles if they have the macroscopically different surfaces (particles having the surface on which macroscopic concavo-convex portion exists and particles having the surface on which no macroscopic concavo-convex portion exists).

As preferred embodiments of the first and the second embodiments of the fifth aspect of the invention, there are cases: such that, among the two groups of the particles having different charge characteristics and different optical reflectance, the particles having the surface, on which the macroscopic concavo-convex portion exists, are obtained by crushing a resin agglomerate; such that, among the two groups of the particles having different charge characteristics and different optical reflectance, the particles having the surface, on which the macroscopic concavo-convex portion exists, are obtained by firmly adhering fine particles on a surface of mother particles; such that the adhering between the mother particles and the fine particles is performed by utilizing a mechanical impact strength; such that, among the two groups of the particles having different charge characteristics and different optical reflectance, the particles having the surface, on which no macroscopic concavo-convex portion exists, are substantially circular particles obtained by polymerizing a resin monomer; such that, among the two groups of the particles having different charge characteristics and different optical reflectance, the particles having the surface, on which no macroscopic concavo-convex portion exists, are substantially circular particles obtained by smoothing the surface under such a condition that crushed particles are exposed at a temperature higher than a melting point of the particles; such that a volume occupying rate of the at least two groups of the image display media filled between the substrates is in a range of 5–70 vol %; and such that an average particle diameter of the two groups of the particles having different charge characteristics and different optical reflectance is 0.5–50 μm. In all the cases, it is possible to perform the first and the second embodiments of the fifth aspect of the invention more preferably.

Moreover, as the second embodiment of the fifth aspect of the invention, there are cases: such that, among the two groups of the particles having different charge characteristics and different reflectance, the fine particles adhered to the surface of the particles, on which no macroscopic concavo-convex portion exists, have a reverse charge polarity with respect to a charge polarity of the particles having the surface, on which no macroscopic concavo-convex portion exists, and, the fine particles do not change a charge polarity of the particles having the surface, on which no macroscopic concavo-convex portion exists, after adhered; and such that an average particle diameter of the fine particles adhered in an electrostatic manner to the surface of the particles, on which no concavo-convex portion exists, is 20–200 nm. In all the cases, it is possible to perform the second embodiment of the fifth aspect of the invention more preferably.

Further, according to the fifth aspect of the invention, an image display device is characterized in that the image display panel mentioned above is installed.

<Disclosure of the Sixth Aspect of the Invention>

An object of the sixth aspect of the invention is to eliminate the drawbacks mentioned above and to provide white particles, white liquid powder using the white particles and an image display device utilizing them as image display media, wherein a whiteness (white reflection factor) can be improved without increasing a filling amount of the white pigment such as titanium oxide.

According to the sixth aspect of the invention, white particles used for an image display device, in which image display media are sealed between opposed substrates, at least one of two substrates being transparent, and in which the image display media, to which an electrostatic field is applied, are made to move so as to display an image, are characterized in that white pigment and hollow particles are filled in a base resin.

In the white particles according to the sixth aspect of the invention, since the white pigment and the hollow particles are filled in the base resin, it is possible to improve a whiteness (white reflection factor) of the white particles by means of an opacifying effect of the hollow particles.

As a preferred embodiment of the white particles according to the sixth aspect of the invention, a filling amount of the white pigment is 100–300 parts by weight with respect to 100 parts by weight of the resin and a filling amount of the hollow particles is 10–60 parts by weight with respect to 100 parts by weight of the resin. Here, the reason for limiting the filling amount of the hollow particles preferably to 10–60 parts by weight with respect to 100 parts by weight of the resin is that, if it is less than 10 parts by weight, an improvement of the white reflection factor can not be detected hardly, and, if it exceeds 60 parts by weight, a mixing process with the resin is difficult.

Moreover, as another preferred embodiments of the white particles according to the sixth aspect of the invention, there are cases: such that the white pigment is one of titanium oxide, zinc oxide and zirconium oxide; such that a composition of the hollow particles is a cross-linking styrene-acrylic; and such that an average particle diameter d(0.5) is 1.0–50 μm. In all the cases, it is possible to improve the whiteness of the white particles more effectively.

Further, according to the invention, an image display device, in which image display media are sealed between opposed substrates, at least one of two substrates being transparent, and in which the image display media, to which an electrostatic filed is applied, are made to move so as to display an image, is characterized in that, as at least one group of the image display media, use is made of the white particles mentioned above.

<Disclosure of a Seventh Aspect of the Invention>

An object of the seventh aspect of the invention is to eliminate the drawbacks mentioned above and to provide image display media and an image display device using the image display media, wherein adhesion/agglutination with respect to an image display panel can be prevented by improving a heat resistance of the image display media.

According to the seventh aspect of the invention, particles used for image display media in an image display device, in which the image display media are sealed between opposed substrates, at least one of two substrates being transparent, and in which the image display media, to which an electrostatic field is applied, are made to move so as to display an image, are characterized in that use is made of a thermosetting resin as a base resin of the particles constituting the image display media, which is obtained by mixing a resin material including a thermosetting resin, effecting a cross-linking reaction by heat and crushing the bridged resin material.

In the image display media according to the seventh aspect of the invention, since use is made of the thermosetting resin as the base resin of the particles constituting the image display media, to which a cross-linking reaction is performed, it is possible to improve the heat resistance. As a result, the adhesion/agglutination with respect to the image display panel does not occur.

As preferred embodiments of the particles used as the image display media according to the seventh aspect of the invention, there are cases: such that, as the thermosetting resin constituting the base resin, use is made of one of polyester resin+blckisocyanate series, alkyd resin+melamine hardening agent series, epoxy resin+amine hardening agent series and urea resin+formaldehyde series; and such that the particles include organic tin catalyst, pigment and charge control agent other than the thermosetting resin constituting the base resin. In all the cases, it is possible to perform the present invention more preferably.

Moreover, according to the seventh aspect of the invention, an image display device is characterized in that use is made of the particles used for the image display media mentioned above.

<Disclosure of an Eighth Aspect of the Invention>

An object of the eighth aspect of the invention is to eliminate the drawbacks mentioned above and to provide an image display panel and an image display device, wherein an image contrast is excellent and is not decreased even after a repetition use, so that an excellent durability and an inexpensive cost can be achieved.

According to the eighth aspect of the invention, particles used for image display media in an image display panel, in which at least two groups of the image display media are sealed between opposed two substrates, at least one of two substrates being transparent, and in which the image display media, to which an electrostatic field is applied, are made to move so as to display an image, are characterized in that a particle shape of at least one of two groups of the particles having different charge characteristics and different optical reflectance, which are included in at least two groups of the image display media, is a flat round shape.

In the image display panel according to the eighth aspect of the invention, since the particle shape of at least one of two groups of the particles having different charge characteristics and different optical reflectance, which are included in at least two groups of the image display media, is a flat round shape, the particles are easily aligned when the particles are moved and aligned on a display surface. Moreover, since a packing of the particles can be made dense, it is possible to improve a contrast of the image. In addition, in the case such that the particle shape of at least one of two groups of the particles having different charge characteristics and different optical reflectance, which are included in at least two groups of the image display media, is a flat round shape, the particles become hard to be agglutinated and adhered with each other, and particle clashes can be reduced when the particles are moved, so that it is possible to improve a durability of the image display. In this case, a degree of flatness can not be limited, but slightly flat particles as compared with a spherical particle can obtain sufficient effects of the present invention.

As preferred embodiments of the image display panel according to the eighth aspect of the invention, there are cases: such that the particles having a flat round shape are white particles; such that a color material of the white particles having a flat round shape is titanium oxide; such that the particles having a flat round shape are formed by crushing a resin sheet to obtain crushed pieces and exposing the crushed pieces at a temperature higher than a melting point of the resin; such that an average particle diameter of the two groups of the particles having different charge characteristics and different optical reflectance, which are included in at least two groups of the image display media, is 0.1–50 μm; and such that a volume occupying rate of at least two groups of the image display media having different colors and different charge characteristics, which are filled between the substrates, is in a range of 5–70 vol %. In all the cases, it is possible to perform the present invention more preferably.

Moreover, according to the eighth aspect of the invention, an image display device is characterized in that the image display panel mentioned above is installed.

<Disclosure of a Ninth Aspect of the Invention>

An object of the ninth aspect of the invention is to eliminate the drawbacks mentioned above and to provide an image display panel and an image display device, wherein an image contrast is excellent and is not decreased even after a repetition use, so that an excellent durability and an inexpensive cost can be achieved.

According to the ninth aspect of the invention, particles used for image display media in an image display panel, in which at least two groups of the image display media including the particles having different colors and different charge characteristics are sealed between opposed two substrates, at least one of two substrates being transparent, and in which the image display media, to which an electrostatic field is applied, are made to move so as to display an image, are characterized in that a relation of particle diameters between two groups of the particles having different colors and different charge characteristics contained in the image display media (deep dark color particles and pale bright color particles) is indicated as Ddark<Dbright, when it is assumed that an average particle diameter of the deep dark color particles is Ddark and an average particle diameter of the pale bright color particles is Dbright.

In the image display panel according to the ninth aspect of the invention, since a relation of particle diameters between two groups of the particles having different colors and different charge characteristics contained in the image display media (deep dark color particles and pale bright color particles) is indicated as Ddark<Dbright, when it is assumed that an average particle diameter of the deep dark color particles is Ddark and an average particle diameter of the pale bright color particles is Dbright, in the case that the particles are aligned on a display surface by moving in reverse directions with each other according to an electrostatic filed direction between the substrates, it is possible to improve a contrast as compared with the case such that the relation of particle diameters is reversed. The above reasons are not detected, but it is assumed as follows. That is, a contrast is improved when the pale bright color particles are aligned on a surface of the display substrate, and thus it is thought that when a relation of particle diameters is Ddark<Dbright, the pale bright color particles are aligned on the display surface, so that a contrast can be improved.

In the image display panel according to the ninth aspect of the invention, especially when white particles are used as the pale bright color particles, the effects mentioned above are very high on a reflection density of a white display image. Therefore, it is preferred that the particles constituting the deep dark color particles are black and the particles constituting the pale bright color particles are white. Moreover, a degree of the relation: Ddark<Dbright is not limited particularly, but it is sufficient if there is a slight diameter difference on this relation. In this case, if the diameter difference is too large, the image contrast becomes worse. Therefore, it is preferred that the diameter relation is 1<Dbright/Ddark<2. Further, it is preferred that the above relation is satisfied with respect to all the particles, and thus it is preferred that, when a classification is performed so as to control the particle diameter, the deep dark color particles are controlled by effecting an over-cut process and the pale bright color particles are controlled by effecting an under-cut process.

Furthermore, as preferred embodiments of the image display panel according to a ninth aspect of the invention, there are cases: such that a particle diameter of at least two groups of the particle having different colors and different charge characteristics is in a range of 1–50 µm; and such that a volume occupying rate of at least two groups of the image display media having different colors and different charge characteristics, which are filled between the substrates, is in a range of 5–70 vol %. In both cases, it is possible to perform the present invention more preferably.

Moreover, according to the ninth aspect of the invention, an image display device is characterized in that the image display panel mentioned above is installed.

<Disclosure of a Tenth Aspect of the Invention>

An object of the tenth aspect of the invention is to eliminate the drawbacks mentioned above and to provide particles used for image display media, which show a charge control property, liquid powder utilizing the particles and an image display device utilizing them.

In a first embodiment of the particles used for the image display media according to the tenth aspect of the invention, particles used for image display media in an image display device, in which the image display media are sealed between opposed substrates, at least one of two substrates being transparent, and in which the image display media, to which an electrostatic field is applied, are made to move so as to display an image, are characterized in that metal oxide (MOx: here, M; metal element, O; oxygen, x; O/M ratio) is added in a base resin of the particles constituting the image display media.

Moreover, in a second embodiment of the particles used for the image display media according to the tenth aspect of the invention, particles used for image display media in an image display device, in which the image display media are sealed between opposed substrates, at least one of two substrates being transparent, and in which the image display media, to which an electrostatic field is applied, are made to move so as to display an image, are characterized in that fatty acid metal salt compound (($C_mH_nCOO$)$yMz$: here, M; metal element, m, n, y, z; integer, 4<m<22) is added in a base resin of the particles constituting the image display media.

As preferred embodiments of the particles used for the image display media according to the tenth aspect of the invention, there are cases: such that a Pauling's electronegativity $\chi$ of an ion of the metal element (M) is $0.79<\chi<1.91$ and has a positive charge characteristic; and such that the metal element is one of Mg, Zn, Ca, Li, Zr, Al, Ni, Cu, Ba and Ti. Moreover, as another preferred embodiments of the particles used for the image display media according to the invention, there are cases: such that a Pauling's electronegativity $\chi$ of an ion of the metal element (M) is $1.50<\chi<2.58$ and has a negative charge characteristic; and such that the metal element is one of Fe, Ti, Cu, Si, Sb, W, Sn, Ge and Co. In all the cases, it is possible to perform the present invention more preferably.

BRIEF DESCRIPTION OF DRAWINGS

FIGS. 1a and 1b are schematic views respectively showing one embodiment of the display method in the image display device according to the invention.

FIGS. 3a and 3b are schematic views respectively depicting still another embodiment of the display method in the display device according to the invention.

FIGS. 7a–7c are schematic views respectively depicting in sequence one embodiment of the manufacturing method of the white particles according to the fourth aspect of the invention.

BEST MODE FOR CARRYING OUT THE INVENTION

At first, a construction of the image display device utilizing the image display media according to the invention will be explained. In the image display device according to the invention, an electrostatic filed is applied by some kind of means with respect to the image display panel, wherein the image display media are sealed between the opposed substrates. The image display media charged in a low potential are attracted toward a high potential side by means of Coulomb's force and so on, and the image display media charged in a high potential are attracted toward a low potential side by means of Coulomb's force and so on. In this case, the image display is performed by effecting a reciprocating motion of the image display media along a direction of the electrostatic field. Therefore, it is necessary to design the image display panel so as to move the image display media evenly and to maintain a stability when a repetition of the image display is performed or when the image is saved. Here, as a force applied to the particles and the liquid powders used for the image display device, there are an electric imaging force with respect to the electrode, an intermolecular force, a liquid cross-linking force, a force of gravity and so on other than an attraction force due to Coulomb's force between the particles or the liquid powders.

Examples of the image display panel used in the image display device according to the invention will be explained with reference to FIGS. 1a, 1b to FIGS. 3a, 3b.

In the examples shown in FIGS. 1a and 1b, two or more groups of particles 3 having different colors (here, white particles 3W and black particles 3B) are moved perpendicularly with respect to substrates 1 and 2 in response to an electrostatic field applied from external to the substrates 1 and 2. Then, a black color display is performed in such a manner that the black particles 3B are detected by an observer, or, a white color display is performed in such a manner that the white particles 3W are detected by an observer. In the example shown in FIG. 1b, a display cell is formed by arranging, for example, grid-like partition walls 4 between the substrates 1 and 2 in addition to the example shown in FIG. 1a.

Figure 2A:
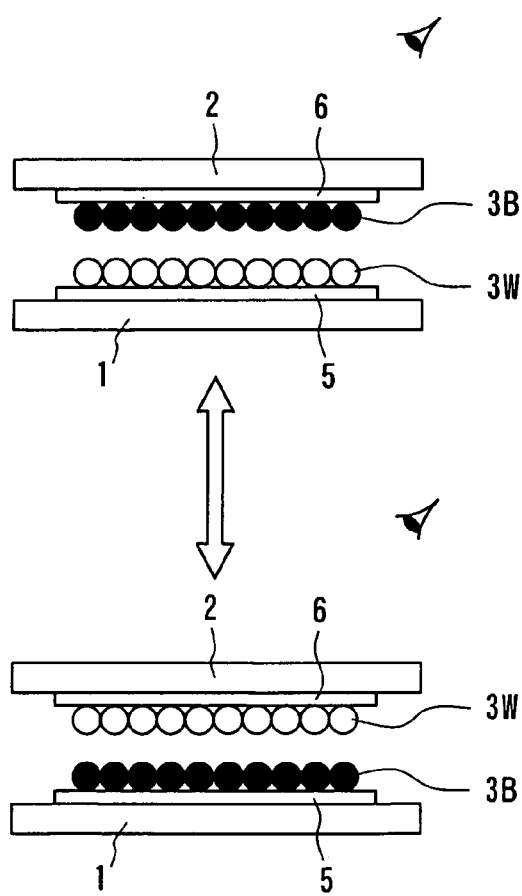
FIGS. 2a and 2b are schematic views respectively illustrating another embodiment of the display method in the display device according to the invention.
Figure 2B:
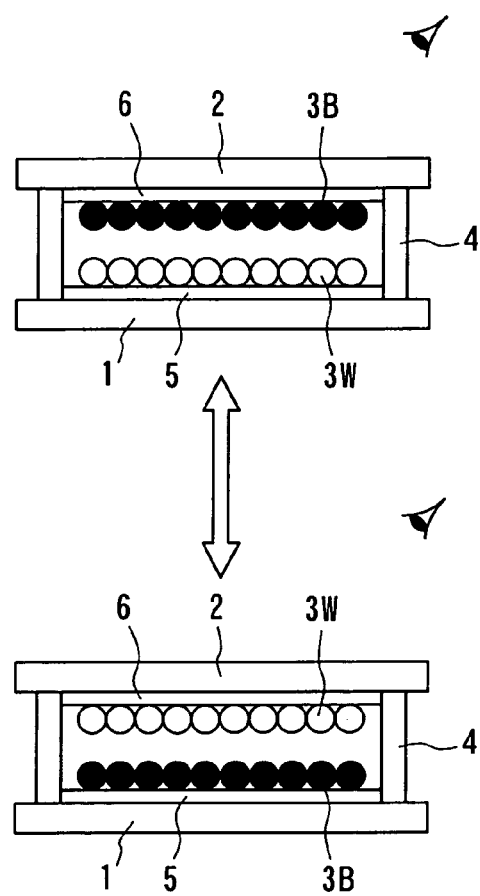

In the examples shown in FIGS. 2a and 2b, two or more groups of particles 3 having different colors (here, white particles 3W and black particles 3B) are moved perpendicularly with respect to the substrates 1 and 2 in response to an electrostatic field generated by applying a voltage between an electrode 5 arranged on the substrate 1 and an electrode 6 arranged on the substrate 2. Then, a black color display is performed in such a manner that the black particles 3B are detected by an observer, or, a white color display is performed in such a manner that the white particles 3W are detected by an observer. In the example shown in FIG. 2b, a display cell is formed by arranging, for example, grid-like partition walls 4 between the substrates 1 and 2 in addition to the example shown in FIG. 2a.

In the examples shown in FIGS. 3a and 2b, one group of particles 3 having a color (here, white particles 3) are moved in parallel to the substrates 1 and 2 in response to an electrostatic field generated by applying a voltage between the electrodes 5 and 6 both arranged on the substrate 1. Then, a white color display is performed in such a manner that the white particles 3W are detected by an observer, or, a color display having a color of the electrode 6 or the substrate 1 is performed in such a manner that the electrode 6 or the substrate 1 is detected by an observer. In the example shown in FIG. 3b, a display cell is formed by arranging, for example, grid-like partition walls 4 between the substrates 1 and 2 in addition to the example shown in FIG. 3a.

Hereinafter, the first to the tenth aspects of the invention will be explained in this order.

<Explanation of the First Aspect of the Invention>

The feature of the first aspect of the invention is to the white particles 3W and the white liquid powder utilizing the white particles 3W, both used as the image display media. Hereinafter, the white particles will be explained.

At first, the white particles 3W sill be explained. The feature of the white powders 3W is that the white particle comprises a center portion and an outer portion coating the center portion, wherein the center portion has a total reflectance of not less that 70% at a boundary between the center portion and the outer portion, and, wherein the outer portion is formed by at least one resin layer, in which fine particles made of a high reflectance material are mixed with a low reflectance material. Here, the reason for limiting the total reflectance at the boundary to not less than 70% is that, if the total reflectance at the boundary is less than 70%, an opacifying rate becomes low due to a small amount of the particles and there is no performance difference between the known particles and the particles according to the invention.

As the center portion showing the total reflectance at the boundary of not less than 70%, use is made of a metal particle, a particle in which a metal film is coated on a resin layer, a particle in which a boundary between the center portion and the outer portion is a reflection film formed by a multi-layer film. The metal particles may be solid particles or may be hollow particles. As a material of the metal particles, use is made of a material selected from a group of aluminum, silver, nickel, chrome, iron, titanium, gold and an alloy thereof. Moreover, as a material of the metal film for the resin layer, use is made of a material selected from a group of aluminum, silver, nickel, chrome, iron, titanium, gold and an alloy thereof. The manufacturing method of the metal film coating the resin layer is not limited, but it is possible to use techniques such as a plating method, a deposition method, a sputtering method and so on. As the multi-layer film, design, material and manufacturing method of a known optical reflection film can be utilized.

Further, a relation between a diameter of the center portion and a diameter of the particle is not particularly limited, but it is preferred that a diameter of the center portion is 50–95% with respect to the particle diameter. If a diameter of the center portion is less than 50% with respect to the particle diameter, a light amount incident upon the boundary becomes relatively small with respect to a total light amount incident upon one particle, and there is no performance difference with respect to the known particles. On the other hand, if a diameter of the center portion exceeds 95% with respect to the particle diameter, a scattering does not occur sufficiently at the resin layer as an outer layer, and thus a regular reflection component becomes larger. This applies a metallic appearance for the particles, and thus it is not possible to used the particles as the image display media for the paper-like display.

Then, the resin layer of the outer layer portion constituting the white particles 3W will be explained. The resin layer of the outer layer portion may be formed by mixing necessary resin, charge couple agent, coloring agent and additives and crushing the mixture, or by polymerizing monomer, or by coating a base portion by the resin, charge couple agent, coloring agent and additives. As the resin, charge couple agent, coloring agent and additives, use is made of the same content as that of the particles explained later. Moreover, the liquid powder (white liquid powder) can be formed by utilizing the white particles mentioned above.

<Explanation of the Second Aspect of the Invention>

In the image display panel according to the second aspect of the invention, since at least two groups of the image display media are constructed by two groups of substantially circular particles having different colors and different charge characteristics and the third particles, it is possible to prevent an agglutination and an adhesion between the particles, and thus it is possible to improve a durability during a repetition use.

Figure 4:
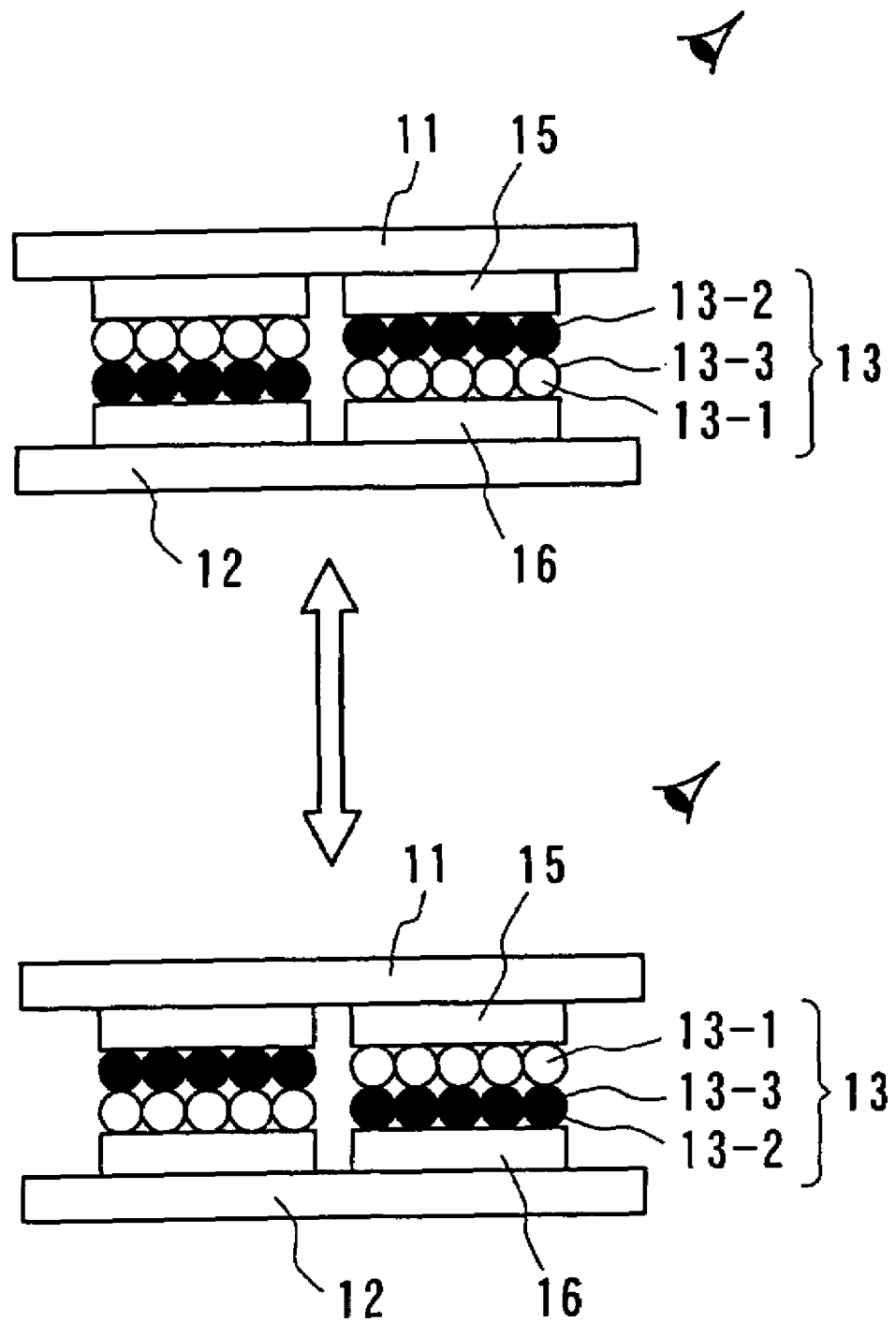
FIG. 4 is a schematic view showing one embodiment of the display method in the image display panel according to the second aspect of the invention.
Figure 5:
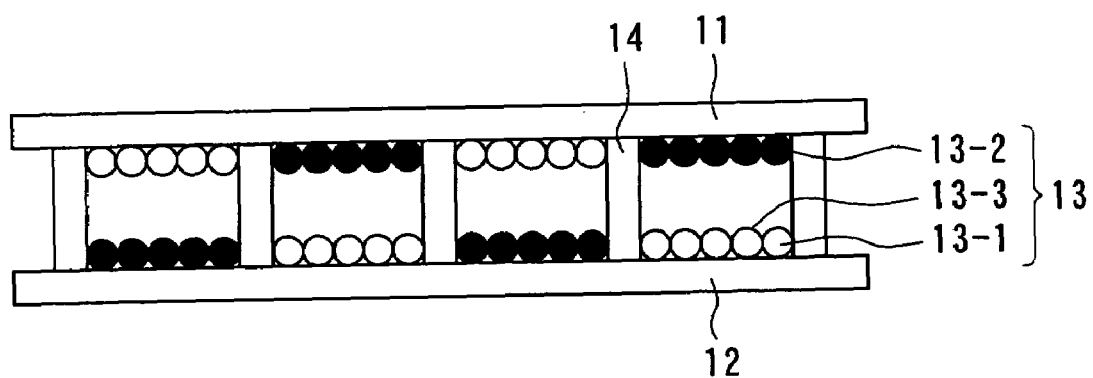
FIG. 5 is a schematic view illustrating one embodiment of the panel construction in the image display panel according to the second aspect of the invention.
Figure 6:
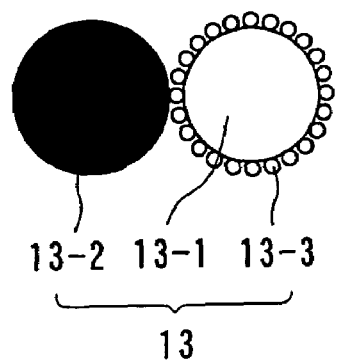
FIG. 6 is a schematic view explaining a state of the particles in the image display panel according to the second aspect of the invention.

FIG. 4 and FIG. 5 are schematic views respectively showing one embodiment of the image display panel according to the invention. In the image display panel according to the invention shown in FIG. 4, the particles 13 constructed by two groups of substantially circular particles having different colors and different charge characteristics (here, white particles 13-1 and black particles 13-2) and third particles 13-3 are sealed as the image display media between substrates 11 and 12, and the particles 13 are moved in a perpendicular direction with respect to the substrates 11 and 12 by applying an electrostatic field generated between electrodes 15 and 16 to the sealed particles 13, so that the image display is performed. In this method, as shown in FIG. 5, a plurality of cells may be formed by arranging partition walls 14 in a space between the substrates 11 and 12, and the image display panel may be formed by sealing the particles 13 in the cells. In the examples shown in FIG. 4 and FIG. 5, since the third particles 13-3 are small as compared with the two groups of particles 13-1 and 13-2, the third particles 13-3 arranged on a surface of one particles 13-1 are not preferably indicated. Actually, as shown in FIG. 6, the third particles 13-3 are adhered on the overall surfaces of the particles 13-1.

The two groups of substantially circular particles used in the second aspect of the invention have different colors and different charge characteristics. The two groups of substantially circular particles may be formed by mixing necessary resin, charge couple agent, coloring agent and additives and crushing the mixture, or, by polymerizing monomer, or, by coating a base portion by the resin, charge couple agent, coloring agent and additives. In this case, since two groups of the particles are used, it is necessary to make the particles different on colors and different on charge characteristics.

Moreover, it is preferred that the particles are formed by the polymerization method so as to make the particles substantially circular. However, the substantially circular particles may be formed by rounding corners of the particles manufactured by the crushing method by means of a mechanical impact force, or, by making a surface of the particles in a fluidized state by means of a temperature over a melting point. As the resin, charge couple agent, coloring agent and additives, use is made of the same content as that of the particles explained later.

The third particles used in the second aspect of the invention are smaller than the two groups of substantially circular particles mentioned above and are existent between two groups of the particles so as to be used as a lubricant.

An average particle diameter of the third particles is in a range of 20 nm–200 nm, preferably 20 nm–150 nm, more preferably 20 nm–100 nm. If the average particle diameter exceeds 200 nm, the third particles are liable to be separated from the two groups of substantially circular particles, and thus the third particles do not show an effect of reducing an agglutination/adhesion force of the two groups of particles due to their existences between two groups of particles. On the other hand, if the average particle diameter is less than 20 nm, the third particles are embedded in a surface of the two groups of substantially circular particles, and thus the third particles do not show an effect of reducing an agglutination/adhesion force of the two groups of particles due to their rolling functions.

As a material, which can be used as the third particles, use is made of: metal oxide such as titanium oxide, tin oxide, zirconium oxide, tungsten oxide, iron oxide; nitride such as titanium nitride; silicon dioxide; and titanium compound. In addition, use is made of fine particles, in which metal oxide such as titanium oxide, tin oxide, zirconium oxide, tungsten oxide, iron oxide; nitride such as titanium nitride; silicon dioxide; and titanium compound, are made in a hydrophobic state; and it is preferred that the fine particles made of silicon dioxide to which a hydrophobic treatment is performed.

The hydrophobic treatment is performed by using hydrophobic agents. As the hydrophobic agents, use is made of chlorosilane, alkoxysilane, silazane and silylisocyanate. Specifically, use is made of methyltrichlorosilane, dimethyldichlorosilane, trimethylchlorosilane, methyltrimethoxysilane, dimethyldimethoxysilane, methyltriethoxysilane, dimethyldiethoxysilane, isobutyltrimethoxysilane, decyltrimethoxysilane, hexamethyldisilazane, terbutyldimethylchlorosilane, vinyltrichlorosilane, vinyltrimethoxysilane, vinyltriethoxysilane and so on.

<Explanation of the Third Aspect of the Invention>

After the inventor's various examinations, it is found that the agglutinated cluster of the particles having the same charge characteristics is originated from a dielectric constant of the particles, and the third aspect of the invention is achieved. That is, the dielectric particles sealed between the substrates each having an electrode generate positive and negative charges having an inverse direction with each other on a surface of the particles due to the applied electrostatic field, if the electrostatic field is generated between the electrodes. This phenomenon is called as a polarization, and, under the polarization, an electric dipole interaction is generated between the particles, so that an attraction force is generated between the particles. Moreover, as another one property of the dielectric body, there is a phenomenon such that it is attracted to and gathered at a place where a strong electric field is generated. It is determined that the above two phenomena promote the agglutination of the same kind of the particles between the electrodes. Theses phenomena become remarkable if the dielectric constant of the particles is made larger. Further, if the particle itself (or only the surface thereof) has a conductivity, the polarization of the particles is made larger. That is to say, it means that an apparent dielectric constant becomes larger. Also in this case, it is determined that a force for agglutinating the same particles is effected.

In order to solve the problems mentioned above, in the third aspect of the invention, an insulation material having a low dielectric property such as a specific inductive capacity $\in_r$ of $\in_r \leq 5.0$ preferably $\in_r \leq 3.0$ is selected as a particle material of the image display media used for the image display, and, even in the case such that use is made of a material having a high dielectric property and a conductive material, a material having a low dielectric property is used as a main member, so that an apparent dielectric constant of the overall particles is maintained at a low value. In addition, in the case such that some material is adhered to a surface of the particles, the adhered material is selected so as not to arrange the material having a high dielectric property and the conductive material on a surface of the particles, and also an amount of the adhered material is controlled. As a result, it is possible to prevent an agglutination between the particles having the same charge characteristics and to achieve an excellent display property.

The image display panel used in the image display device according to the invention may be applied to a panel having a display method such that the charged particles 3 as two groups of image display media having different colors (referred to FIGS. 1a, 1b and FIGS. 2a, 2b; here, white particles 3W and black particles 3B) are moved in a perpendicular direction with respect to the substrates 1 and 2, and may be applied to a panel having a display method such that the charge particles 3 having one color (referred to FIGS. 3a and 3b) are moved in a parallel direction with respect to the substrates 1 and 2. In the examples shown in FIG. 1 to FIG. 3, a numeral 4 is a partition wall arranged according to need, and numerals 5, 6 are electrodes for applying an electrostatic field to the particles 3 according to need.

The feature of the image display media according to the invention is that a specific inductive capacity is limited. At first, general particles will be explained. The particles may be formed by mixing necessary resin, charge couple agent, coloring agent and additives and crushing the mixture, or by polymerizing monomer, or by coating a base portion by the resin, charge couple agent, coloring agent and additives. As the resin, charge couple agent, coloring agent and additives, use is made of the same content as that of the particles explained later.

Examples of specific treatments for decreasing a specific inductive capacity of the particles will be indicated later.

(1) In the case such that a material having a high dielectric property such as titanium oxide (II) is used as a white pigment, a resin constituting a main member of the particles is constructed by a material having a low dielectric property such as polystyrene resin, and a material having a high dielectric property is scattered in the main member by not more than 50% (volume ratio), so that a specific inductive capacity of the overall particles is decreased.

(2) In the black particle manufacture, use is made of a black dye having a low dielectric insulation property other than carbon black used normally as a pigment. Moreover, the other conductive materials are not used as a construction material of the particles. If it is necessary to include the conductive material, a specific inductive capacity of the overall particles is decreased in the same manner as that of the above item (1). In addition, an amount of the conductive material precipitated on the surface is made smaller so as not to apply a conductivity on a surface of the particles.

(3) Also in the case such that a liquid and so on whose molecular has a polarity is sealed in the particles, a specific inductive capacity is made higher, and thus it is not used for a material constituting the particles. For example, such a liquid is water.

<Explanation of the Fourth Aspect of the Invention>

The feature of the fourth aspect of the invention relates to the white particles 3W and the white liquid powders utilizing the white particles 3W among the particles used for the image display media. Hereinafter, the white particles will be explained.

At first, the white particles according to the fourth aspect of the invention will be explained. FIGS. 7a–7c are schematic views respectively depicting in sequence one embodiment of the manufacturing method of the white particles according to the fourth aspect of the invention. The white particles according to the invention will be explained with reference to FIGS. 7a–7c. At first, as shown in FIG. 7a, a white pigment, here, primary particles of titanium oxide 21 as one example, is prepared. Moreover, it is preferred that an average particle diameter of the primary particles is smaller than that of the white particles which are finally obtained, and thus the average particle diameter is preferred in a range of for example 0.01–1.0 µm. More preferably, it is in a range of 0.2–0.3 µm at which a reflectance is highest.

Then, a binder 22 is thinly coated on a surface of respective primary particles of titanium oxide 21 thus prepared. As the binder 22, use is made of any material if it has a low refraction factor and shows a good coating performance. For example, use is made of acrylic, PS (polystyrene), PE (polyethylene), PET (polyethylene terephthalate), PC (polycarbonate), POM (polyacetal), fluorine, epoxy, various silane coupling agents, various siloxane and so on. Moreover, as a coating method, it is preferred to use a method in which the binder 22, which is dissolved by a solvent, is sprayed to the primary particles of titanium oxide 21 or a method in which the primary particles of titanium oxide 21 are scattered in a liquid of the binder 22 and it is sprayed and died.

Then, the primary particles of titanium oxide 21, the surface of which is coated by the binder 22, are mixed and agitated in a flowing gas or mechanically, and they are agglutinated and granulated while introducing a number of fine bubbles so as to obtain particles having a predetermined particle diameter. As a result, as shown in FIG. 7c, it is possible to obtain white particles 24 made of secondary particles having a predetermined diameter, manufactured by agglutinating and granulating the primary particles of titanium oxide 21 including the fine bubbles 23 therein and coated by the binder 22. The agglutinating and granulating processes may be performed when the binder 22 is coated on the primary particles of titanium oxide 22. Use may be made of zinc oxide as a substitute of titanium oxide. Moreover, the liquid powder (white liquid powder) mentioned below may be obtained by utilizing the white particles mentioned above.

<Explanation of the Fifth Aspect of the Invention>

In the image display panel according to a first embodiment of the fifth aspect of the invention, since one of the two groups of the particles having different charge characteristics and different optical reflectance included in the at least two groups of the image display media has a surface on which macroscopic concavo-convex portion exists, and the other of the two groups of the particles has a surface on which no macroscopic concavo-convex portion exists, it is possible to prevent the agglutination and the adhesion of the particles and to improve a durability in a repetition use.

Moreover, in the image display panel according to a second embodiment of the fifth aspect of the invention, since one of the two groups of the particles having different charge characteristics and different optical reflectance included in the at least two groups of the image display media has a surface on which macroscopic concavo-convex portion exists, and the other of the two groups of the particles has a surface on which no macroscopic concavo-convex portion exists and on which fine particles are adhered in an electrostatic manner, it is possible to prevent the agglutination and the adhesion of the particles and to improve a durability in a repetition use.

FIGS. 1a and 1b–FIGS. 3a and 3b are schematic views respectively showing one embodiment of the image display panel according to the invention. In the image display panels according to the invention shown in FIGS. 1a and 1b–FIGS. 2a and 2b, the particles as two groups of the image display media having different charge characteristics and different optical reflectance (here, the white particles 3W and the black particles 3B) are sealed between the substrates 1 and 2, and the image display is performed by moving the sealed particles 3 in a perpendicular direction with respect to the substrates 1 and 2, to which an electrostatic field is applied externally (embodiments of FIGS. 1a and 1b) or an electrostatic field generated between the electrodes 5 and 6 is applied (embodiments of FIGS. 2a and 2b). Moreover, in the image display panel according to the invention shown in FIGS. 3a and 3b, the particles as one group of the image display media (here, the white particles 3W) are sealed between the substrates 1 and 2, and the image display is performed by moving the sealed particles 3 in a parallel direction with respect to the substrates 1 and 2, to which an electrostatic field generated between the electrodes 5 and 6 is applied. In the display methods mentioned above, as shown in FIG. 1b, FIG. 2b and FIG. 3b, the image display panel may be formed in such a manner that a plurality of cells are formed by arranging the partition walls 4 in a space between the substrates 1 and 2, and the particles 3 are sealed in the cells.

Figure 8A:
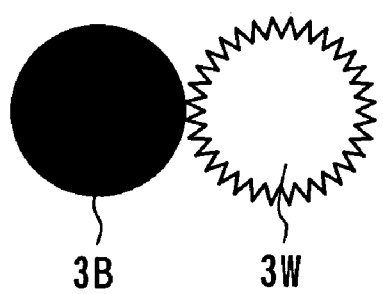
FIGS. 8a and 8b are schematic views respectively explaining a state of the particles in the image display panel utilizing the image display media according to the first embodiment of the fifth aspect of the invention.
Figure 8B:
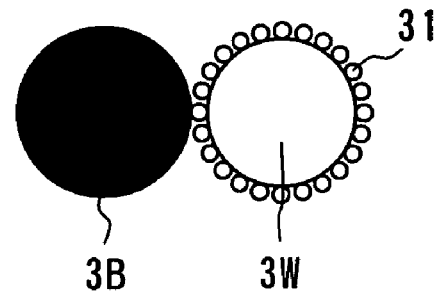

At first, the particles used for the first embodiment of the fifth aspect of the invention will be explained. As shown in FIGS. 8a and 8b, the particles used for the first embodiment of the fifth aspect of the invention are two groups of the particles having different charge characteristics and different optical reflectance included in the at least two groups of the image display media, wherein one particles 3W have a surface on which macroscopic concavo-convex portion exists and the other particles 3B have a surface on which no macroscopic concavo-convex portion exists. The particles may be formed by mixing necessary resin, charge couple agent, coloring agent and additives and crushing the mixture, or, by polymerizing monomer, or, by coating a base portion by the resin, charge couple agent, coloring agent and additives. In this case, since two groups of the particles are used, it is necessary to use two groups of the particles wherein one particles have a surface on which macroscopic concavo-convex portion exists and the other particles have a surface on which no macroscopic concavo-convex portion exists.

Figure 9A:
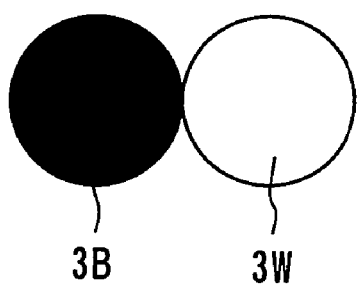
FIGS. 9a and 9b are schematic views respectively explaining a state of the particles in the image display panel utilizing the known image display media.
Figure 9B:
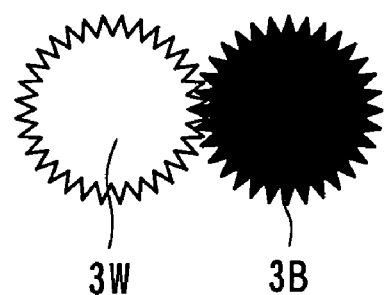

Generally, in the case that use is made of the two groups of the particles having different charge characteristics and having the surface on which no macroscopic concavo-convex portion exists, as shown in FIG. 9a, since a space is not formed between the two particles attracted with each other due to the different charge characteristics, it is easy to generate the agglutination and the adhesion between the two particles. On the other hand, in the case that use is made of the two groups of the particles having different charge characteristics and having the surface on which macroscopic concavo-convex portion exists, as shown in FIG. 9b, since the two particles are stuck with each other, it is also easy to generate the agglutination and the adhesion between the two particles. In the particles used for the first embodiment of the fifth aspect of the invention, as shown in FIGS. 8a and 8b, the macroscopic surface states of the two groups of the particles having different charge characteristics are made to be different. Therefore, it is possible to make a space between the two groups of the particles attracted with each other due to the different charge characteristics, and thus it is possible to prevent the agglutination and the adhesion of the particles.

Moreover, in the particles used commonly for the first embodiment and the second embodiment of the fifth aspect of the invention, as shown in FIG. 8b wherein the fine particles 31 are firmly adhered to the mother particle 3W having the surface on which no macroscopic concavo-convex portion exists so as to make the particles having the surface on which macroscopic concavo-convex portion exists, it is important not to easily detach the fine particles 31 from the mother particle 3W. Therefore, it is preferred to use the method wherein the fine particles 31 are firmly adhered to the mother particle 3W by utilizing the mechanically impact force so as not to detach the fine particles 31 from the mother particle 3W.

Then, the particles used for the second embodiment of the fifth aspect of the invention will be explained.

Figure 10:
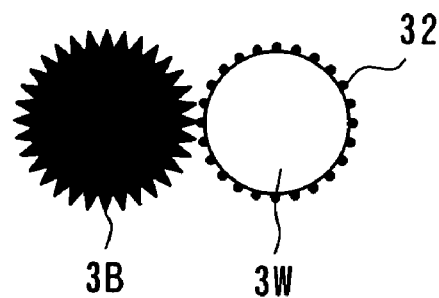
FIG. 10 is a schematic view explaining a state of the particles in the image display panel utilizing the image display media according to the second embodiment of the fifth aspect of the invention.

As shown in FIG. 10, the particles used for the second embodiment of the fifth aspect of the invention are two groups of the particles having different charge characteristics and different optical reflectance included in the at least two groups of the image display media, wherein one particles 3W have a surface on which macroscopic concavo-convex portion exists and the other particles 3B have a surface on which no macroscopic concavo-convex portion exists and on which fine particles are adhered in an electrostatic manner. The particles may be formed by mixing necessary resin, charge couple agent, coloring agent and additives and crushing the mixture, or, by polymerizing monomer, or, by coating a base portion by the resin, charge couple agent, coloring agent and additives. In this case, since two groups of the particles are used, it is necessary to use two groups of the particles wherein one particles have a surface on which macroscopic concavo-convex portion exists and the other particles have a surface on which no macroscopic concavo-convex portion exists. The manufacturing method is the same as that of the first embodiment.

Generally, in the case that use is made of the two groups of the particles having different charge characteristics and having the surface on which no macroscopic concavo-convex portion exists, as shown in FIG. 9a, since a space is not formed between the two particles, it is easy to generate the agglutination and the adhesion between the two particles. On the other hand, in the case that use is made of the two groups of the particles having different charge characteristics and having the surface on which macroscopic concavo-convex portion exists, as shown in FIG. 9b, since the two particles are stuck with each other, it is also easy to generate the agglutination and the adhesion between the two particles. In the particles used for the second embodiment of the fifth aspect of the invention, as shown in FIG. 10, the macroscopic surface states of the two groups of the particles having different charge characteristics are made to be different. Therefore, it is possible to make a space between the two groups of the particles attracted with each other due to the different charge characteristics, and thus it is possible to prevent the agglutination and the adhesion of the particles. This effect is the same as that of the first embodiment.

Figure 11:
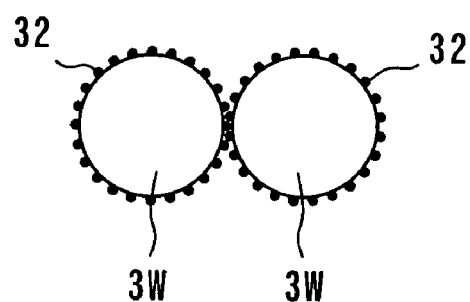
FIG. 11 is a schematic view explaining another state of the particles in the image display panel utilizing the image display media according to the second aspect of the invention.

Moreover, in the particles used for the second embodiment of the fifth aspect of the invention, in addition to the common effects of the first embodiments mentioned above, as shown in FIG. 11, a space between the particles can be obtained since the fine particles are adhered to the surface of the particles in an electrostatic manner if the particles having the same charge characteristics are agglutinated due to no macroscopic concavo-convex portion on the surface of the particles. Further, since the adhesion between the particles is due to an electrostatic force and is not firm, the fine particles function to be lubricant between the particles by their rolling on the surface of the particles, so that it is possible to prevent the agglutination and the adhesion of the particles with each other.

Then, in the particles used for the first and the second embodiments of the fifth aspect of the invention, the fine particles (child particles) used for making the macroscopic concavo-convex portion on the surface by firmly adhering them to the surface of the particles (mother particles) on which no macroscopic concavo-convex portion exists will be explained.

An average particle diameter of the fine particles is in a range of 20 nm–200 nm, preferably 20 nm–150 nm, more preferably 20 nm–100 nm. If the average particle diameter exceeds 200 nm, an adhesion property with respect to the particle surface on which no concavo-convex portion exists becomes weak, and the fine particles are liable to be dropped from the surface on which no concavo-convex portion exists, so that the effect of reducing the agglutination and adhesion forces of the two particles can not be achieved. On the other hand, if the average particle diameter is less than 20 nm, the particles having the surface on which concavo-convex portion exists can not be obtained, and they are the same particles having the surface on which no concavo-convex portion exists if the fine particles are adhered to the surface, so that the effect of reducing the agglutination and adhesion forces of the two particles can not be achieved.

The charge polarity of the fine particles may be the same polarity as that of the particles (mother particles) having the surface on which no concavo-convex portion exists. However, it is important to firmly adhere the fine particles to the mother particles, and thus it is preferred that the fine particles have the reverse polarity as that of the particles (mother particles), thereby firmly adhereing the fine particles (child particles) on the surface of the particles (mother particles) on which no concavo-convex portion exists.

As a material, which can be used as the fine particles (child particles), use is made of: metal oxide such as titanium oxide, tin oxide, zirconium oxide, tungsten oxide, iron oxide; nitride such as titanium nitride; silicon dioxide; and titanium compound. In addition, use is made of fine particles, in which metal oxide such as titanium oxide, tin oxide, zirconium oxide, tungsten oxide, iron oxide; nitride such as titanium nitride; silicon dioxide; and titanium compound, are made in a hydrophobic state; and it is preferred that the fine particles made of silicon dioxide to which a hydrophobic treatment is performed.

The hydrophobic treatment is performed by using hydrophobic agents. As the hydrophobic agents, use is made of chlorosilane, alkoxysilane, silazane and silylisocyanate. Specifically, use is made of methyltrichlorosilane, dimethyldichlorosilane, trimethylchlorosilane, methyltrimethoxysilane, dimethyldimethoxysilane, methyltriethoxysilane, dimethyldiethoxysilane, isobutyltrimethoxysilane, decyltrimethoxysilane, hexamethyldisilazane, terbutyldimethylchlorosilane, vinyltrichlorosilane, vinyltrimethoxysilane, vinyltriethoxysilane and so on.

In this invention, it is important to firmly adhere the fine particles on the particle surface on which no concavo-convex portion exists. For example, by using the apparatus for applying a mechanical impact force on the particle surface such as Hybridizer (Nara Machinery Co. Ltd.) and Mechano-Fusion (Hosokawa Micron Co. Ltd.), it is possible to firmly adhere the fine particles (child particles) on the surface of the particles (mother particles) on which no concavo-convex portion exists.

Then, the fine particles used for the second aspect of the fifth aspect of the invention will be explained.

The fine particles used for the second aspect of the fifth aspect of the invention are the particles smaller than the two groups of particles having different colors and different charge characteristics. Moreover, the fine particles are adhered in an electrostatic manner on the particle surface on which no macroscopic concavo-convex portion exists, among the two groups of particles having different colors and different charge characteristics, and function to be a lubricant between the particles having the surface on which no macroscopic concavo-convex portion exists (between the particles having the same charge characteristics), among the two groups of the particles having different colors and different charge characteristics.

An average particle diameter of the fine particles is in a range of 20 nm–200 nm, preferably 20 nm–150 nm, more preferably 20 nm–100 nm. If the average particle diameter exceeds 200 nm, the fine particles are difficult to be adhered in an electrostatic manner on the particle surface on which no macroscopic concavo-convex portion exists and do not achieve the effect for reducing the agglutination and adhesion force due to a presence of the fine particles between the two particles. On the other hand, if the average particle diameter is less than 20 nm, an electrostatic adhesion force becomes too strong, and an effect as the lubricant due to a rolling of the fine particles on the particle surface is not obtained, so that the effect for reducing the agglutination and adhesion force between the two particles having the same charge characteristics is not obtained.

The charge polarity of the fine particles is a reverse charge polarity with respect to the particles having the surface on which no macroscopic concavo-convex portion exists, among the two groups of the particles having different colors and different charge characteristics, and are adhered in an electrostatic manner on the particle surface on which no macroscopic concavo-convex portion exists. If the charge polarity is the same as that of the particles having the surface on which no concavo-convex portion exists, the fine particles are liable to be adhered in an electrostatic manner on the particle surface on which macroscopic concavo-convex portion exists, and thus the effect for reducing the agglutination and adhesion force of the two particles. In the case that the fine particles have a reverse charge polarity with respect to the particles having the surface on which no concavo-convex portion exists, if a variation of the charge characteristics is so large as that the charge polarity of the particles having the surface on which macroscopic concavo-convex portion exists, it is not preferred since a balance of the charge characteristics between the particles having the surface on which macroscopic concavo-convex portion exists and the particles having the surface on which no macroscopic concavo-convex portion exists is deteriorated.

As a material, which can be used as the fine particles, use is made of: metal oxide such as titanium oxide, tin oxide, zirconium oxide, tungsten oxide, iron oxide; nitride such as titanium nitride; silicon dioxide; and titanium compound. In addition, use is made of fine particles, in which metal oxide such as titanium oxide, tin oxide, zirconium oxide, tungsten oxide, iron oxide; nitride such as titanium nitride; silicon dioxide; and titanium compound, are made in a hydrophobic state; and it is preferred that the fine particles made of silicon dioxide to which a hydrophobic treatment is performed.

The hydrophobic treatment is performed by using hydrophobic agents. As the hydrophobic agents, use is made of chlorosilane, alkoxysilane, silazane and silylisocyanate. Specifically, use is made of methyltrichlorosilane, dimethyldichlorosilane, trimethylchlorosilane, methyltrimethoxysilane, dimethyldimethoxysilane, methyltriethoxysilane, dimethyldiethoxysilane, isobutyltrimethoxysilane, decyltrimethoxysilane, hexamethyldisilazane, ter-butyldimethyl, chlorosilane, vinyltrichlorosilane, vinyltrimethoxysilane, vinyltriethoxysilane and so on.

<Explanation of the Sixth Aspect of the Invention>

The feature of the sixth aspect of the invention relates to the white particles 3W among the particles used for the image display media and the white liquid powders utilizing the white particles 3W.

At first, the white particles according to the invention will be explained. In the white particles according to the invention, the feature is that, in the case of manufacturing them by a mixing and crushing method, a part of the white pigment mixed for making the base resin to the white color is substituted by the hollow particles. Here, the reason for limiting the manufacturing method to the mixing and crushing method is that, in the polymerization method wherein it is necessary to agglutinate the monomer and pigment in a liquid during the manufacture of the polymerized particles, the hollow particles are floated in the liquid if use is made of the hollow particles in the substitute of the pigment, and the hollow particles can not be utilized.

In the case of manufacturing the white particles by means of a mixing and crushing method, base resin, white pigments (all of them or a part of them are made of hollow particles), CCA (charge control agents), various filling agents (fluidity applying agents, adhesion preventing agents and so on), and so on are mixed by means of a two-axis extrusion apparatus or a plastomill, and the thus obtained clusters or pellets are crushed to a predetermined particle diameter. As the crushing method, use is made of a refrigerated crushing method and various crushing methods. Here, as the base resin, use is made of PMMA (polymethylmethacrylate), acrylic urethane, acryl and so on preferably. Moreover, as the white pigments, use is made of titanium oxide, zinc oxide, zirconium oxide and so on preferably.

Figure 12:
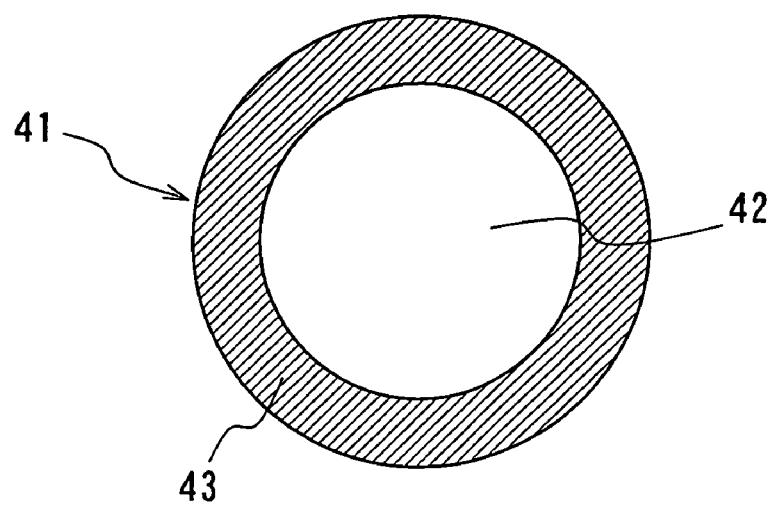
FIG. 12 is a schematic view showing one embodiment of the hollow particle used for the white particles according to the sixth aspect of the invention.

FIG. 12 is a schematic view showing one construction of the hollow particles used as the white particles according to the invention. In the embodiment shown in FIG. 12, the hollow particle 41 is constructed by a void portion 42 and a circular highly cross-linking polymer layer 43 surrounding all the void portion 42. As the highly cross-linking polymer layer 43, it is preferred to use a cross-linking styrene-acryl. The hollow particle 42 mentioned above has features originated from a hollow portion such as a light scattering property and a heat insulating property and has feature originated from the cross-linking polymer such as a heat resisting property and a liquid proof property. Particularly, since a light scattering occurs by means of the highly cross-linking polymer layer 43 and an air of the void portion 42 and thus an opacifying effect can be obtained, it is possible to obtain the white particles if a part of the white pigments are substituted by the hollow particles.

In the white particles according to the sixth aspect of the invention, the white particle is constructed by filling the white pigments and the hollow particles into the base resin. Generally, a whiteness of the white particles, in which use is made of titanium oxide only as the white pigments, become maximum, if about 200 parts by weight of titanium oxide is added with respect to 100 parts by weight of the base resin. However, if an additional amount of titanium oxide becomes 300 parts by weight, it is difficult to perform the mixing and a scattering state becomes bad, so that the whiteness decreases. If 10–50 parts by weight of the hollow particles are added in addition to titanium oxide with respect to 100 parts by weight of the base resin, it is possible to improve the whiteness as compared with the state of adding 200 parts by weight of titanium oxide.

<Explanation of the Seventh Aspect of the Invention>

In the image display panel in which the particles according to the seventh aspect of the invention are used as the image display media, an electrostatic filed is applied by some kind of means with respect to the image display panel, wherein two or more groups of the image display media are sealed between the opposed substrates. The image display media charged in a low potential are attracted toward a high potential side by means of Coulomb's force and so on, and the image display media charged in a high potential are attracted toward a low potential side by means of Coulomb's force and so on. In this case, the image display is performed by effecting a reciprocating motion of the image display media along a direction of the electrostatic field. Therefore, it is necessary to design the image display panel so as to move the image display media evenly and to maintain a stability when a repetition of the image display is performed or when the image is saved.

FIGS. 1a and 1b–FIGS. 3a and 3b are schematic views respectively showing one embodiment of the image display panel according to the seventh aspect of the invention. In the image display panels according to the invention shown in FIGS. 1a and 1b–FIGS. 2a and 2b, the particles as two groups of the image display media having different charge characteristics and different optical reflectance (here, the white particles 3W and the black particles 3B) are sealed between the substrates 1 and 2, and the image display is performed by moving the sealed particles 3 in a perpendicular direction with respect to the substrates 1 and 2, to which an electrostatic field is applied externally (embodiments of FIGS. 1a and 1b) or an electrostatic field generated between the electrodes 5 and 6 is applied (embodiments of FIGS. 2a and 2b). Moreover, in the image display panel according to the invention shown in FIGS. 3a and 3b, the particles as one group of the image display media (here, the white particles 3W) are sealed between the substrates 1 and 2, and the image display is performed by moving the sealed particles 3 in a parallel direction with respect to the substrates 1 and 2, to which an electrostatic field generated between the electrodes 5 and 6 is applied. In the display methods mentioned above, as shown in FIG. 1b, FIG. 2b and FIG. 3b, the image display panel may be formed in such a manner that a plurality of cells are formed by arranging the partition walls 4 in a space between the substrates 1 and 2, and the particles 3 are sealed in the cells.

The feature of the seventh aspect of the invention is the construction of the particles used for the image display media in the image display panel having the construction mentioned above. That is, use is made of a thermosetting resin as a base resin of the particles constituting the image display media, which is obtained by mixing a resin material including a thermosetting resin, effecting a cross-linking reaction by heat and crushing the bridged resin material. In this manner, if use is made of the thermosetting resin to which the cross-linking reaction is effected, a heat resistance is improved by about 30° C. as compared with the embodiment in which the known thermosetting resin is used as the base resin. As a composition of the thermosetting resin, it is most preferred to use so called polyurethane such as polyester resin+blckisocyanate series (more specifically, polyester resin having OH end+blckisocyanate series having three or more functional groups). In addition, as a composition wherein the resin material can be subjected to a heat cross-linking reaction after the mixing at a temperature higher than that of the mixing process, use is made of alkyd resin+melamine hardening agent series, epoxy resin+amine hardening agent series and urea resin+formaldehyde series. As the other material of the thermosetting resin as the base material, use is made of pigments (titanium oxide, carbon black and so on), charge couple agent (CCA), organic tin catalyst and so on suitably.

In order to manufacture the particles according to the invention, the thermosetting resin as the base material and the resin materials such as pigments, charge control agents, organic tin catalyst and do on are mixed to form a compound. The thus formed compound is subjected to the cross-linking reaction under a condition of predetermined time×temperature (higher than a temperature during the mixing), and then crushed by means of a jet mill to obtain the particles.

<Explanation of the Eighth Aspect of the Invention>

Figure 13:
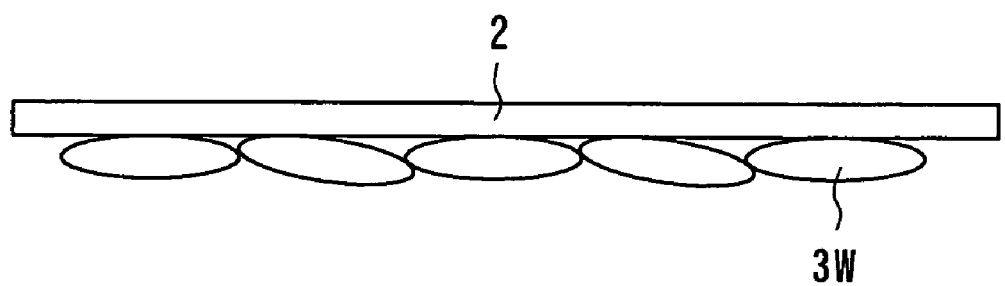
FIG. 13 is a schematic view illustrating one state of the particles in which the flat round particles used for the image display media according to the eighth aspect of the invention are aligned on the substrate surface without spacing.
Figure 14:
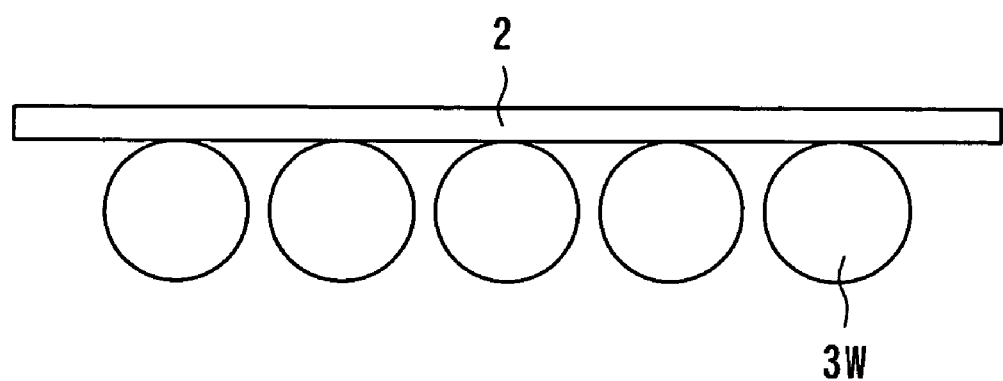
FIG. 14 is a schematic view depicting one state in which the circular particles used for the image display media are aligned on the substrate surface with a space.

The feature of the image display panel according to the eighth aspect of the invention is that a particle shape of at least one of two groups of the particles having different charge characteristics and different optical reflectance, which are included in at least two groups of the image display media, is a flat round shape. According to the eighth aspect of the invention, as apparently understood from the comparison between FIG. 13 showing the state such that the flat round particles are aligned on the substrate without spaces and FIG. 14 showing the state such that the circular particles are aligned on the substrate with spaces, the particles are liable to be aligned without spaces and the space between the particles can be minimized, so that it is possible to improve a contrast.

The particles used for the eighth aspect of the invention is that a particle shape of at least one of two groups of the particles having different charge characteristics and different optical reflectance, which are included in at least two groups of the image display media, is a flat round shape. The particles are manufactured by mixing necessary resin, charge control agents, coloring agents and the other additives, forming the mixture to a thin sheet, crushing the sheet, and melting the corners of the crushed pieces by exposing the crushed pieces at a temperature higher than a melting point of the resin. Moreover, the particles may be manufactured by polymerizing the monomer, but it is difficult to obtain the flat round particles having a particle diameter preferably used for the present invention (average particle diameter; 0.1–50 μm). As the resin, charge control agents, coloring agents and the other additives, use may be made of the materials of the particles mentioned below.

<Explanation of the Ninth Aspect of the Invention>

The feature of the ninth aspect of the invention is that a relation of particle diameters between two groups of the particles having different colors and different charge characteristics contained in the image display media (deep dark color particles and pale bright color particles) is indicated as Ddark<Dbright, when it is assumed that an average particle diameter of the deep dark color particles is Ddark and an average particle diameter of the pale bright color particles is Dbright. That is, by making the average particle diameter of the pale bright color particles Dbright larger than that of the deep dark color particles Ddark, it is possible to obtain the image display panel having an excellent image contrast, an excellent image contrast after repetition use and an inexpensive cost.

Moreover, a degree of the relation: Ddark<Dbright is not limited particularly, but it is sufficient if there is a slight diameter difference on this relation. In this case, if the diameter difference is too large, the image contrast becomes worse. Therefore, it is preferred that the diameter relation is 1<Dbright/Ddark<2. Here, the reason for preferably limiting Dbright/Ddark<2 is as follows. In the case that the particle diameter difference is two or more times, there is a case such that, even if the pale bright color particles having a larger particle diameter are aligned accurately, the deep dark color particles having a smaller particle diameter intrude into the space between the pale bright color particles. In this case, there is a drawback such that the whiteness is decreased since the deep dark color particles are arranged in the space between the aligned pale bright color particles.

Then, the particles having different colors and different charge characteristics according to the invention will be explained.

The particles having different colors and different charge characteristics used for the invention are that one particles are made of the deep bright color particles and the other particles are made of the pale bright color particles. The particles may be manufactured by a method wherein necessary resin, charge control agents, coloring agents and the other additives are mixed, crushed and classified, or a method wherein the monomer is polymerized and classified. As the materials for resin, charge control agents, coloring agents and the other additive, use is made of the same material of the particles mentioned below.

<Explanation of the Tenth Aspect of the Invention>

The feature of the tenth aspect of the invention is the construction of the particles used for the image display media in the image display panel having the construction mentioned above. That is, a charge property is controlled by adding metal oxide or fatty acid metal salt compound into the base resin of the particles. If metal oxide or fatty acid metal salt compound is added into the base resin of the particles as mentioned above, it is possible to control the charge property in a desired manner as compared with the known case such that a charge property is not controlled.

As the metal oxide (MOx: here, M; metal element, O; oxygen, x; O/M ratio) added in the base resin of the particles, any materials which are known as the metal oxide can be used. For example, use is made of $MgO$, $ZnO$, $Al_2O_3$, $SiO_2$, $SnO_2$, $Fe_3O_4$, $Fe_2O_3$ and so on.

As the fatty acid metal salt compound ($(C_mH_nCOO)yM_z$: here, M; metal element, m, n, y, z; integer, 4<m<22) added in the base resin of the particles, any materials which are known as the fatty acid metal salt compound can be used. For example, use is made of octanoic salt (m=10), lauric salt (m=12), myristic salt (m=14), palmitic salt (m=16), stearic salt (m=18), oleic salt (m=18), linoleic salt (m=18) of Mg, Ca, Al, Fe, Li, Ba and so on.

Moreover, as preferred embodiments of the particles in which the metal oxide or the fatty acid metal salt compound is added into the base resin of the particles, there are cases: such that a Pauling's electronegativity $\chi$ of an ion of the metal element (M) is $0.79<\chi<1.91$ and has a positive charge characteristic; and such that the metal element is one of Mg, Zn, Ca, Li, Zr, Al, Ni, Cu, Ba and Ti. Here, the reason for preferably limiting a Pauling's electronegativity $\chi$ of an ion of the metal element (M) to $0.79<\chi<1.91$ is as follows. That is, if the Pauling's electronegativity $\chi$ is smaller than 0.79, a charge amount becomes too high and thus the image display media is not reversed when the image display panel is constructed. If the Pauling's electronegativity $\chi$ is larger than 1.91, a charge amount becomes too small and the image display media is not reversed when the image display panel is constructed.

Further, as the other preferred embodiments of the particles in which the metal oxide or the fatty acid metal salt compound is added into the base resin of the particles, there are cases: such that a Pauling's electronegativity $\chi$ of an ion of the metal element (M) is $1.50<\chi<2.58$ and has a negative charge characteristic; and such that the metal element is one of Fe, Ti, Cu, Si, Sb, W, Sn, Ge and Co. Here, the reason for preferably limiting a Pauling's electronegativity $\chi$ of an ion of the metal element (M) to $1.50<\chi<2.58$ is as follows. That is, if the Pauling's electronegativity $\chi$ is smaller than 1.50, a charge amount becomes too high and thus the image display media is not reversed when the image display panel is constructed. If the Pauling's electronegativity $\chi$ is larger than 2.58, a charge amount becomes too small and the image display media is not reversed when the image display panel is constructed.

<Explanation of Common Portions>

Hereinafter, the common construction members of the image display device according to the first aspect to the tenth aspect of the invention will be explained in the order of substrate, electrode and partition wall, and also the particles and the liquid powders will be explained.

As the substrate, at least one of the substrates is the transparent substrate 2 through which a color of the particles can be observed from outside of the device, and it is preferred to use a material having a high transmission factor of visible light and an excellent heat resistance. The substrate 1 may be transparent or may be opaque. Examples of the substrate material include polymer sheets such as polyethylene terephthalate, polyether sulfone, polyethylene, polycarbonate, polyimide or acryl and a metal sheets having a flexibility and inorganic sheets such as glass, quartz or so having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, there is a drawback for making the thin-type image display device.

As the substrate arranged according to need, the electrode 6 arranged to a side of the substrate 2, in which transparency is necessary since it is an observation side, is formed of electro-conductive materials, which are transparent and having pattern formation capability. As such electro-conductive materials, indium oxide, metals such as aluminum, gold, silver, copper and so on or conductive polymer such as polyaniline, polypyrrole and polythiophene formed by vacuum vapor deposition method, coating method, and so on. Additionally, the thickness of the electrode may be suitable unless the electro-conductivity is absent or any hindrance exists in optical transparency, and it is preferable to be 3 to 1000 nm, more preferable to be 5 to 400 nm. The material and the thickness of the electrode 5 arranged to a side of the electrode 5 are the same as those of the electrode 6, but transparency is not necessary. In this case, the applied outer voltage may be superimposed with a direct current or an alternate current.

As the partition wall 4 arranged according to need, a shape of the partition wall is suitably designed in accordance with a kind of the image display media used for the display and is not restricted. However, it is preferred to set a width of the partition wall to 2–100 μm more preferably 3–50 μm and to set a height of the partition wall to 10–500 μm more preferably 10–200 μm. Moreover, as a method of forming the partition wall, use may be made of a double rib method wherein ribs are formed on the opposed substrates respectively and they are connected with each other and a single rib method wherein a rib is formed on one of the opposed substrates only. The present invention may be preferably applied to both methods mentioned above.

Figure 15:
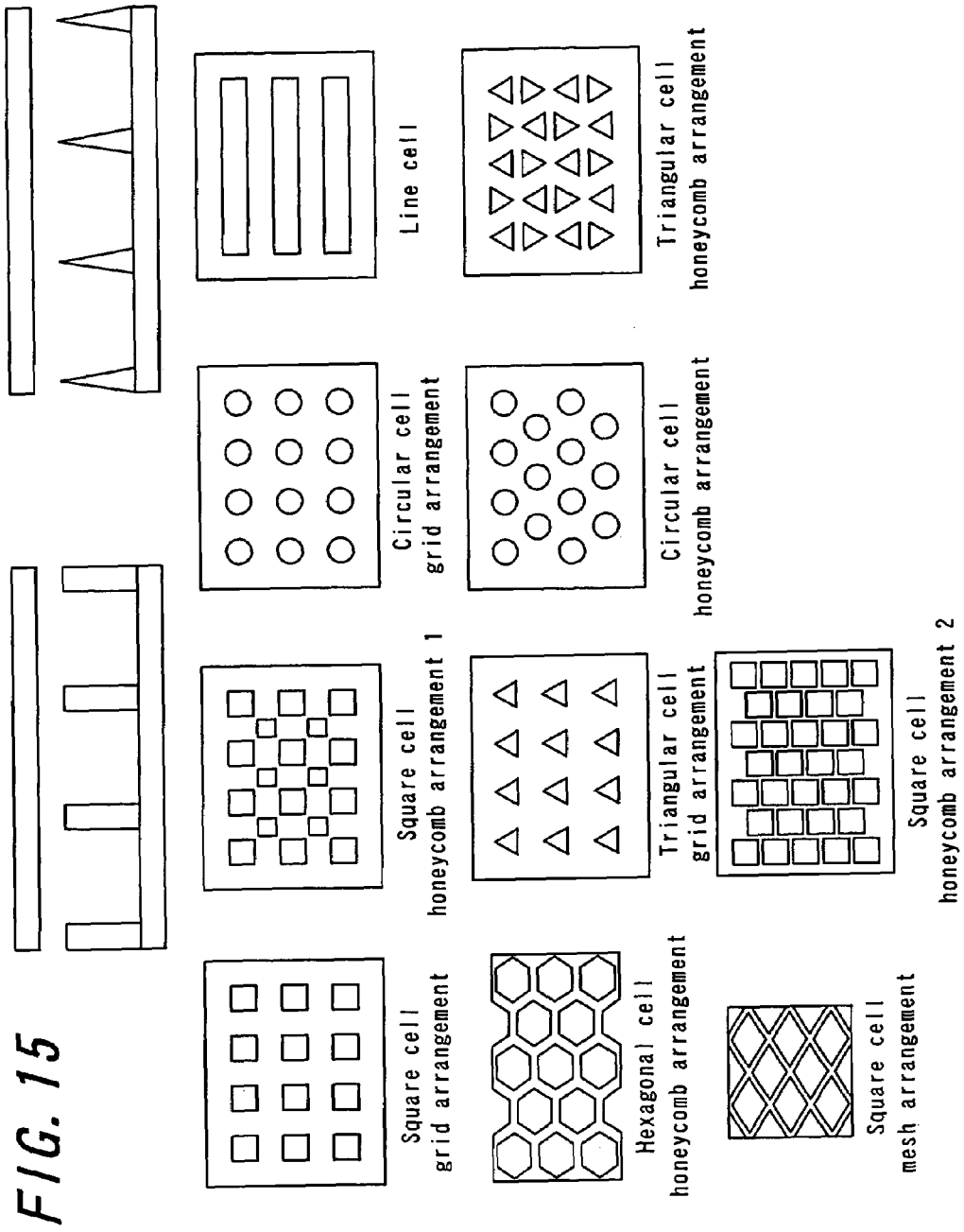
FIG. 15 is a schematic view showing one embodiment of the partition shape in the image display panel utilizing the image display media according to the invention.

The display cell formed by the partition walls each made of rib has a square shape, a triangular shape, a line shape, a circular shape and a hexagon shape, and has an arrangement such as a grid, a honeycomb and a mesh, as shown in FIG. 15 viewed from a plane surface of the substrate. It is preferred that the portion corresponding to a cross section of the partition wall observed from the display side (an area of the frame portion of the display cell) should be made as small as possible. In this case, a clearness of the image display can be improved. The formation method of the partition wall is not particularly restricted, however, a screen-printing method, a sandblast method, a photolithography method and an additive method. Among them, it is preferred to use a photolithography method using a resist film.

Then, the particles used for the image display device according to the invention will be explained. The particles have a resin as a main ingredient and may include charge control agents, coloring agents, inorganic additives and so on therein according to need as is the same as the known one. Hereinafter, resin, charge control agents, coloring agents and the other additives will be explained.

Typical examples of the resin include urethane resin, urea resin, acrylic resin, polyester resin, acryl urethane resin, acryl urethane silicone resin, acryl urethane fluorine resin, acryl fluorine resin, silicone resin, acryl silicone resin, epoxy resin, polystyrene resin, styrene acryl resin, polyolefin resin, butyral resin, vinylidene chloride resin, melamine resin, phenolic resin, fluorocarbon resin, polycarbonate resin, polysulfon resin, polyether resin, polyamide resin and so on, and it is possible to combine two or more resins. For the purpose of controlling the attaching force with the substrate, acryl urethane resin, acryl silicone resin, acryl fluorocarbon resin, acryl urethane silicone resin, acryl urethane fluorocarbon resin, fluorocarbon resin and silicone resin are preferred.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indunsren blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, indunsren brilliant orange RK, benzidine orange G, Indusren brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These coloring agents may be used alone or in combination of two or more kinds thereof. Particularly, carbon black is preferable as the black coloring agent, and titanium oxide is preferable as the white coloring agent.

Moreover, it is preferred to set the average particle diameter of the particles according to the invention d(0.5) to 0.1–50 μm, and to make the particles even and regulated shapes. If the average particle diameter exceeds this range, the image clearness sometimes deteriorated, and, if the average particle size is smaller than this range, an agglutination force between the particles becomes larger and the movement of the particles is prevented.

Further, in the present invention, as for the particle diameter distribution of respective particles, it is preferred that particle diameter distribution Span of the particles, which is defined by the following formula, is not more than 5 preferably not more than 3:

$$\mathrm{Span} = (d(0.9) - d(0.1))/d(0.5);$$

(here, d(0.5) means a value of the particle size expressed by μm wherein an amount of the particles having the particle size larger than or smaller than this value is 50%, d(0.1) means a value of the particle size expressed by μm wherein an amount of the particles having the particle size smaller than this value is 10%, and d(0.9) means a value of the particle size expressed by μm wherein an amount of the particles having the particle size smaller than this value is 90%).

If the particle size distribution Span of the particles is set to not more than 5, the particle size becomes even and it is possible to perform an even particle movement.

Further, as a correlation between the particles, it is preferred to set a ratio of d(0.5) of the particles having smallest diameter with respect to d(0.5) of the particles having largest diameter to not more than 50 preferably not more than 10. Even if the particle diameter distribution Span is made smaller, the particles having different charge properties with each other are moved in the opposite direction. Therefore, it is preferred that the particle diameters are formed closely with each other and equivalent amounts of the particles are easily moved in the opposite direction. To this end, the above range is obtained.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A charge amount of the particles is properly depend upon the measuring condition. However, it is understood that the charge amount of the particles used for the image display media in the image display panel is substantially depend upon an initial charge amount, a contact with respect to the partition wall, a contact with respect to the substrate, a charge decay due to an elapsed time, and specifically a saturation value of the particles during a charge behavior is a main factor.

After various investigations of the inventors, it is fond that an adequate range of the charged values of the particles used for the image display media can be estimated by performing a blow-off method utilizing the same carrier particles so as to measure the charge amount of the particles.

Then, the liquid powders used for the image display media in the image display device according to the invention will be explained. It should be noted that a name of the liquid powders used for the image display media in the image display device according to the invention is registered as "electric liquid powder" in Japan by the applicant.

In the present invention, a term "liquid powder" means an intermediate material having both of liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subjectbook). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powder.

That is, as is the same as the definition of the liquid crystal (intermediate phase between a liquid and a solid), the liquid powder according to the invention is a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the image display device according to the invention, a solid material is used as a dispersant.

The image display panel which is a target of the present invention has a construction such that the liquid powders composed of a solid material stably floating as a dispersoid in a gas and exhibiting a high fluidity in an aerosol state are sealed between opposed two substrates, wherein one of two substrates is transparent. Such liquid powders can be made to move easily and stably by means of Coulomb's force and so on generated by applying a low voltage.

As mentioned above, the liquid powders means an intermediate material having both of liquid properties and particle properties and exhibiting a self-fluidity without utilizing gas force and liquid force. Such liquid powders become particularly an aerosol state. In the image display device according to the invention, the liquid powders used in a state such that a solid material is relatively and stably floating as a dispersoid in a gas.

As the aerosol state, it is preferred that an apparent volume in a maximum floating state is two times or more than that in none floating state, more preferably 2.5 times or more than that in none floating state, and most preferably three times or more than that in none floating state. In this case, an upper limit is not defined, but it is preferred that an apparent volume is 12 times or smaller than that in none floating state.

If the apparent volume in the maximum floating state is smaller than two times, a display controlling becomes difficult. On the other hand, if the apparent volume in the maximum floating state is larger than 12 times, a handling inconvenience during a liquid powder filling operation into the device such as a particle over-scattering occurs. That is, it is measured by filling the liquid powders in a transparent closed vessel through which the liquid powders are seen; vibrating or dropping the vessel itself to obtain a maximum floating state; and measuring an apparent volume at that time from outside of the vessel. Specifically, the liquid powder having a volume ⅕ of the vessel is filled as the liquid powder in a vessel with a polypropylene cap having a diameter (inner diameter) of 6 cm and a height of 10 cm (product name I-boy® produced by As-one Co., Ltd.), the vessel is set in the vibrator, and a vibration wherein a distance of 6 cm is repeated at a speed of 3 reciprocating/sec. is performed for 3 hours. Then, the apparent volume in the maximum floating state is obtained from an apparent volume just after a vibration stop.

Moreover, in the image display panel according to the invention, it is preferred that a time change of the apparent volume of the liquid powders satisfies the following formula:

$$V_{10}/V_5 > 0.8;$$

here, $V_5$ indicates the apparent volume (cm³) of the liquid powders after 5 minutes from the maximum floating state; and $V_{10}$ indicates the apparent volume (cm³) of the liquid powder after 10 minutes from the maximum floating state. In this case, in the image display panel according to the invention, it is preferred to set the time change $V_{10}/V_5$ of the apparent volume of the liquid powders to larger than 0.85, more preferably larger than 0.9, most preferably larger than 0.95. If the time change $V_{10}/V_5$ is not larger than 0.8, the liquid powders are substantially equal to normal particles, and thus it is not possible to maintain a high speed response and durability according to the invention.

Moreover, it is preferred that the average particle diameter d(0.5) of the particle materials constituting the liquid powders is 0.1–20 µm, more preferably 0.5–15 µm, most preferably 0.9–8 µm. If the average particle diameter d(0.5) is less than 0.1 µm, a display controlling becomes difficult. On the other hand, if the average particle diameter d(0.5) is larger than 20 µm, a display is possible, but opacifying power is decreased and thus a thin shape device is difficult. Here, the average particle diameter d(0.5) of the particle materials constituting the liquid powder is equal to d(0.5) in the following particle diameter distribution Span.

It is preferred that particle diameter distribution Span of the particle material constituting the liquid powder, which is defined by the following formula, is not more than 5 preferably not more than 3:

$$\text{Particle diameter distribution: Span}=(d(0.9)-d(0.1))/d(0.5);$$

here, d(0.5) means a value of the particle diameter expressed by µm wherein an amount of the particle material constituting the liquid powder having the particle diameter larger than this value is 50% and an amount of the particle material constituting the liquid powder having the particle diameter expressed by µm wherein an amount of the particle material constituting the liquid powder having a particle diameter smaller than this value is 10%, and d(0.9) means a value of the particle diameter expressed by µm wherein an amount of the particle material constituting the liquid powder having the particle diameter smaller than this value is 90%. If the particle diameter distribution Span of the particle materials constituting the liquid powder is set to not more than 5, the particle diameter becomes even and it is possible to perform an even liquid powder movement.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution. In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The liquid powder may be formed by mixing necessary resin, charge control agent, coloring agent, additive and so on and grinding them, or, by polymerizing from monomer, or, by coating a particle with resin, charge control agent, coloring agent, and additive and so on. Hereinafter, typical examples of resin, charge control agent, coloring agent, additive and so on constituting the liquid powder will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, acryl urethane resin, acryl urethane silicone resin, acryl urethane fluorocarbon polymers, urethane resin, fluorocarbon polymers are preferred.

Examples of the electric charge control agent include, positive charge control agent including the fourth grade ammonium salt compound, nigrosine dye, triphenylmethane compound, imidazole derivatives, and so on, and negative charge control agent such as metal containing azo dye, salicylic acid metal complex, nitroimidazole derivative and so on.

As for a coloring agent, various kinds of organic or inorganic pigments or dye as will be described below are employable.

Examples of black pigments include carbon black, copper oxide, manganese dioxide, aniline black, and activate carbon.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, and Indunsren blue BC.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, and C.I. pigment red 2.

Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, tartrazinelake, and C.I. pigment yellow 12.

Examples of green pigments include chrome green, chromium oxide, pigment green B, C.I. pigment green 7, Malachite green lake, and final yellow green G.

Examples of orange pigments include red chrome yellow, molybdenum orange, permanent orange GTR, pyrazolone orange, Balkan orange, indunsren brilliant orange RK, benzidine orange G, Indusren brilliant orange GK, and C.I. pigment orange 31.

Examples of purple pigments include manganese purple, first violet B, and methyl violet lake.

Examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

These pigments and inorganic additives may be used alone or in combination of two or more kinds thereof. Particularly, carbon black is preferable as the black coloring agent, and titanium oxide is preferable as the white coloring agent.

However, if the above materials are only mixed or coated with no contrivance, the liquid powder exhibiting an aerosol state cannot be obtained. The regular method of forming the liquid powder exhibiting an aerosol state is not defined, but the following method is preferably used.

At first, inorganic fine particles having an average particle size of 20–100 nm preferably 20–80 nm are preferably fixed on a surface of materials constituting the liquid powder. Moreover, it is preferred that the inorganic fine particles are made of tow or more groups of fine particles. Further, it is preferred to treat the inorganic fine particles by a silicone oil. Here, as for the inorganic fine particles, use may be made of silicon dioxide (silica), zinc oxide, aluminum oxide, magnesium oxide, cerium oxide, ferric oxide, copper oxide and so on.

In this case, a method of fixing the inorganic fine particles is important. For example, use may be made of hybridizer (NARA Machinery Industry Co., Ltd.) or mechano-fusion (Hosokawa Micron Co., Ltd.), and the liquid powders showing an aerosol state are formed under a predetermined condition (for example processing time).

Further, in the present invention, it is important to control a gas in a gap surrounding the liquid powder between the substrates, and a suitable gas control contributes an improvement of display stability. Specifically, it is important to control a humidity of the gap gas to not more than 60% RH at 25° C., preferably not more than 50% RH, more preferably not more than 35% RH.

The above gap means a gas portion surrounding the liquid powder obtained by substituting an occupied portion of the image display media (particles or liquid powder 3), an occupied portion of the partition wall 4 (if the partition wall 4 is arranged) and a seal portion of the device from the space between the opposed substrates 1 and 2 in FIGS. 1–3.

A kind of the gap gas is not limited if it has the humidity mentioned above, but it is preferred to use dry air, dry nitrogen gas, dry helium gas, dry carbon dioxide gas, dry methane gas and so on. It is necessary to seal this gas in the device so as to maintain the humidity mentioned above. For example, it is important to perform the operations of filling the liquid powder and assembling the substrate under an atmosphere having a predetermined humidity and to apply a seal member and a seal method for preventing a humidity inclusion from outside of the device.

A distance between the substrates in the image display panel used for the image display device according to the invention may be controlled at any rate if the image display media can be moved and a contrast can be maintained. However, it is normally controlled to 10–500 μm preferably 10–200 μm.

It is preferred to control a volume occupied rate of the image display media in a space between the opposed substrates to 5–70 vol %, more preferably 5–60 vol %. If the volume occupied rate of the image display media exceeds 70 vol %, the particles become difficult to move, and if it is less than 5 vol %, a clear image display is not performed.

Hereinafter, the actual embodiments according to the first to the tenth aspects of the invention will be explained.

<As to the Examples According to the First Aspect of the Invention>

EXAMPLE 1

Particles

An aluminum ball having an average particle diameter of 7.0 μm was used for the center portion constituting a core. A total reflection rate on the surface of the aluminum ball constituting the center portion to be used (corresponding to a boundary between the center portion and the outer portion) was 85%. The known white material was coated to the aluminum ball constituting the center portion by means of Agglomaster (HOSOKAWA MICRON CORPORATION) so as to form the outer layer portion, and the white particle according to the invention was obtained.

The white material was produced in such a manner that acrylic urethane resin: EAU53B (Asia Industry Co., Ltd.)/IPDI cross-linking agent: Excel-Hardener HX (Asia Industry Co., Ltd.), titanium oxide 10 phr, charge control agent: BontronE89 (Orient Chemical Industries Ltd.) 2 phr were added, mixed, ground and classified by a jet-mill.

The thus produced white particle had an average particle diameter of 9.0 μm and a surface charge density of −60 μC/m$^2$. Moreover, luminance factors of the base white particle and the white particle according to the invention were measured, and as a result, the luminance factor of the white particle according to the invention was improved by 5% with respect to the luminance factor of the base known white particle.

EXAMPLE 2

Particles

A particle, in which aluminum was deposited by 500 nm on a PMMA ball having an average particle diameter of 5.0 μm, was used as the center portion constituting the core. A total reflection rate on the surface of the aluminum deposited film constituting the center portion to be used (corresponding to a boundary between the center portion and the outer portion) was 82%. The known white material was coated to this center portion by means of Agglomaster (HOSOKAWA MICRON CORPORATION) so as to form the outer layer portion, as is the same as the example 1, and the white particle according to the invention was obtained.

The thus produced white particle had an average particle diameter of 8.0 μm and a surface charge density of −50 μC/m$^2$. Moreover, luminance factors of the base white particle and the white particle according to the invention were measured, and as a result, the luminance factor of the white particle according to the invention was improved by 4% with respect to the luminance factor of the base known white particle.

EXAMPLE 3

Particles

A particle, in which titanium oxide having a film thickness of 80 nm and silicone oxide having a film thickness of 100 nm were alternately deposited on a PC ball having an average particle diameter of 5.0 μm, was used as the center portion constituting the core. A total reflection rate on the surface of the deposited film constituting the center portion to be used (corresponding to a boundary between the center portion and the outer portion) was 91%. The known white material was coated to this center portion by means of Agglomaster (HOSOKAWA MICRON CORPORATION) so as to form the outer layer portion, as is the same as the example 1, and the white particle according to the invention was obtained.

The thus produced white particle had an average particle diameter of 7.0 μm and a surface charge density of −60 μC/m$^2$. Moreover, luminance factors of the base white particle and the white particle according to the invention were measured, and as a result, the luminance factor of the white particle according to the invention was improved by 7% with respect to the luminance factor of the base known white particle.

COMPARATIVE EXAMPLE 1

Particles 100 parts by weight of acrylic resin and 20 parts by weight of titanium oxide having an average particle diameter of 200 nm were mixed, ground and classified so as to obtain the particles having an average particle diameter of 4–8 μm. The thus obtained particles were measured in the same manner as that of the example 1, and, as a result, the luminance factor was 40%.

COMPARATIVE EXAMPLE 2

Particles

A total reflection rate of a PMMS ball was 10%. This ball is used as the core, and the known white material was coated to this ball by means of Agglomasterr (HOSOKAWA MICRON CORPORATION). An average particle diameter was 80 μm and a surface charge density was −40 μC/m$^2$. The thus obtained particles were measured in the same manner as that of the example 1, and, as a result, the luminance factor was 28%.

EXAMPLE 4

Liquid Powder

By using hybridizer (Nara Machinery Co., Ltd.), the white particles of the example 1, external additive A (silica H2000, Wacker Ltd.) and external additive B (silica SS20, Japan Silica Ltd.) were set therein and treated at 4800 rpm for 5 minuets, so that the external additives were fixed on a surface of the white particles to obtain the white liquid powder. The luminance factor of the white liquid powder according to the invention was improved by 6% with respect to the luminance factor of the base known white liquid powder.

EXAMPLE 5

Liquid Powder

By using hybridizer (Nara Machinery Co., Ltd.), the white particles of the example 2, external additive A (silica H2000, Wacker Ltd.) and external additive B (silica SS20, Japan Silica Ltd.) were set therein and treated at 4800 rpm for 5 minuets, so that the external additives were fixed on a surface of the white particles to obtain the white liquid powder. The luminance factor of the white liquid powder according to the invention was improved by 4% with respect to the luminance factor of the base known white liquid powder.

EXAMPLE 6

Liquid Powder

By using hybridizer (Nara Machinery Co., Ltd.), the white particles of the example 3, external additive A (silica H2000, Wacker Ltd.) and external additive B (silica SS20, Japan Silica Ltd.) were set therein and treated at 4800 rpm for 5 minuets, so that the external additives were fixed on a surface of the white particles to obtain the white liquid powder. The luminance factor of the white liquid powder according to the invention was improved by 6% with respect to the luminance factor of the base known white liquid powder.

COMPARATIVE EXAMPLE 3

Liquid Powder

By using hybridizer (Nara Machinery Co., Ltd.), the white particles of the comparative example 1, external additive A (silica H2000, Wacker Ltd.) and external additive B (silica SS20, Japan Silica Ltd.) were set therein and treated at 4800 rpm for 5 minuets, so that the external additives were fixed on a surface of the white particles to obtain the white liquid powder. The thus obtained liquid powder was measured in the same manner as that of the comparative example 1, and, as a result, the luminance factor was 42%.

COMPARATIVE EXAMPLE 4

Liquid Powder

By using hybridizer (Nara Machinery Co., Ltd.), the white particles of the comparative example 2, external additive A (silica H2000, Wacker Ltd.) and external additive B (silica SS20, Japan Silica Ltd.) were set therein and treated at 4800 rpm for 5 minuets, so that the external additives were fixed on a surface of the white particles to obtain the white liquid powder. The thus obtained liquid powder was measured in the same manner as that of the comparative example 1, and, as a result, the luminance factor was 28%.

<As to the Examples According to the Second Aspect of the Invention>

The image display panels according to the examples and the comparative examples were manufactured according to the following method and were estimated according to the following standard.

(Manufacture of the Image Display Panel)

The image display panel was manufactured as follows.

At first, a substrate (7 cm×7 cm) with an electrode was prepared, and on the substrate, a rib having a height of 400 µm was produced to form a partition wall having a stripe shape.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height of the partition wall) was controlled to be 400 µm. Then, a dry photo-resist was adhered. With respect to the adhered dry photo-resist, an exposing step and an etching step were performed so as to form a mask by which a partition wall pattern having a line of 50 µm, a space of 400 µm and a pitch of 250 µm can be formed. Then, unnecessary portions were removed by a sandblast to form a predetermined partition wall having a stripe shape. Then, cells were formed between the partition walls on the substrate.

As the image display media, two groups of the substantially circular particles having different colors and different charge characteristics were prepared respectively, and particles A were manufactured in such a manner that one of the two groups of the substantially circular particles and third particles having a different charge characteristics as that of the one particles were mixed at a predetermined mixing ratio, while the other of the two groups of the substantially circular particles were prepared as particles B.

The substrate (opposed substrate) with the ribs was moved in a dried container having a moisture of not greater than 40% RH, the particles A as first particles were scattered in the container from a nozzle arranged at an upper portion of the container; and the scattered particles A were filled in the cells on the substrate provided at a lower portion of the container. Continuously, the particles B as second particles were scattered in the container from an another nozzle arranged at an upper portion of the container; and the scattered particles B were filled in the cells, in which the particles A were previously filled, on the substrate provided at a lower portion of the container, so that the particles B were filled on the particles A. The same amounts of the particles A and the particles B were mixed with each other, and a total volume occupying rate of the both particles with respect to a space between two substrates stacked with a distance was controlled to become 22 vol %.

Then, another substrate was sacked with the substrate in which the particles were filled in the cells, and a periphery of the substrate was adhered by means of epoxy adhesive so as to seal the particles, so that the image display panel was manufactured.

(Estimation of Display Functions)

Black color display and white color display were repeated by inversing a potential of 250V applied to the image display device installed in the image display panel manufactured. The estimation of the display function was performed in such a manner that contrast ratios at initial point, after 10000 times repetition, and after 5 days left, were measured by using a reflection image densitometer. Here, the contrast ratio was defined by contrast ratio=reflection density at black display/reflection density of white display. For reference, a maintaining rate was defined as a ratio of the contrast ratio after 10000 times repetition or after 5 days left with respect to the initial contrast ratio.

EXAMPLE 11

The image display panel was manufactured according to the method of manufacturing the image display panel mentioned above, and the estimation of the display functions mentioned above was performed. In this case, the particles A and the particles B used in the Example 11 were prepared as follows.

The substantially circular particles constituting the particles A were produced in such a manner that acrylic urethane resin: EAU53B (Asia Industry Co., Ltd.)/IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. Further, the thus ground particles were formed to substantially circular particles by applying a mechanically impact force by means of hybridizer apparatus (Nara Machinery Co., Ltd.) and the thus formed particles were classified so as to produce the primary particles A. The substantially circular particles constituting the thus produced primary particles A were black particles having an average particle diameter of 9.1 µm, a substantially circular shape, a macroscopically smooth surface and a negative charge characteristic. Then, silica SS20 (Japan Silica Ltd.) as third particles was mixed with the thus produced primary particles A by using Henshel mixer so as to produce the particles A.

The substantially circular particles constituting the particles B were produced as follows. That is, a liquid was prepared in such a manner that tershally buthylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the substantially circular particles were obtained by classifying the dried member by means of classifier (MDS-2: NIPPON PNEUMATIC NFG. CO., LTD.). The thus produced substantially circular particles were circular white particles having an average particle diameter of 8.5 µm, a macroscopically smooth surface and a positive charge characteristic, and were used as the particles B. The estimation results were shown in the following Table 1.

EXAMPLE 12

The image display panel was manufactured according to the method of manufacturing the image display panel mentioned above, and the estimation of the display functions mentioned above was performed. In this case, the particles A and the particles B used in the Example 12 were prepared as follows.

The substantially circular particles constituting the particles A were produced as follows. That is, a liquid was prepared in such a manner that styrene monomer, AIBN (azobisisobuthyronitrile) 0.5 parts and azo-compound containing metal (BontronS34: Orient Chemical Industries Ltd.) 5 parts by weight were dissolved, and carbon black as a black pigment (MA100: Mitsubishi Chemical Co., Ltd.) 3 parts by weight were dispersed therein. Then, the thus prepared liquid was suspended and polymerized by using a surface active agent (laurylic sodium sulphate) 0.5% of tenth times amount, and then subjected to a filtrating and drying process. Then, the substantially circular particles were obtained by classifying the dried member by means of classifier (MDS-2: NIPPON PNEUMATIC MFG. CO., LTD.). The thus produced substantially circular particles constituting circular black particles having an average particle diameter of 8.9 µm and a macroscopically smooth surface and a negative charge characteristic. Then, silica H2000/4 (Wacker Ltd.) as third particles was mixed with the thus produced primary particles A by using Henshel mixer so as to produce the particles A.

The substantially circular particles constituting the particles B were produced in such a manner that acrylic urethane resin: EAU53B (Asia Industry Co., Ltd.)/IPDI cross-linking agent: Excel-Hardener HX (Asia Industry Co., Ltd.), titanium oxide 10 parts by weight, charge control agent: BontronE89 (Orient Chemical Industries Ltd.) 2 parts by weight were added, mixed and ground by a jet-mill. Further, the thus ground particles were formed to substantially circular particles by applying a mechanically impact force by means of hybridizer apparatus (Nara Machinery Co., Ltd.) and the thus formed particles were classified. The substantially circular particles constituting the thus produced primary particles B were white particles having an average particle diameter of 7.0 µm, a substantially circular shape, a macroscopically smooth surface and a positive charge characteristic, and were used as the particles B. The estimation results were shown in the following Table 1.

COMPARATIVE EXAMPLE 11

The image display panel was manufactured according to the method of manufacturing the image display panel mentioned above, and the estimation of the display functions mentioned above was performed. In this case, the particles A and the particles B used in the Comparative example 11 were prepared as follows.

The substantially circular particles constituting the particles A were produced in such a manner that acrylic urethane resin: EAU53B (Asia Industry Co., Ltd.)/IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. Further, the thus ground particles were formed to substantially circular particles by applying a mechanically impact force by means of hybridizer apparatus (Nara Machinery Co., Ltd.) and the thus formed particles were classified so as to produce the primary particles A. The substantially circular particles constituting the thus produced primary particles A were black particles having an average particle diameter of 9.3 µm, an infinite shape, a macroscopically concavo-convex surface and a negative charge characteristic. Then, silica SS20 (Japan Silica Ltd.) as third particles was mixed with the thus produced primary particles A by using Henshel mixer so as to produce the particles A.

The substantially circular particles constituting the particles B were produced as follows. That is, a liquid was prepared in such a manner that tershally buthylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the substantially circular particles were obtained by classifying the dried member by means of classifier (MDS-2: NIPPON PNEUMATIC MFG. CO., LTD.). The thus produced substantially circular particles were circular white particles having an average particle diameter of 8.5 µm, a macroscopically smooth surface and a positive charge characteristic, and were used as the particles B. The estimation results were shown in the following Table 1.

COMPARATIVE EXAMPLE 12

The image display panel was manufactured according to the method of manufacturing the image display panel mentioned above, and the estimation of the display functions mentioned above was performed. In this case, the particles A and the particles B used in the Comparative example 12 were prepared as follows.

The substantially circular particles constituting the particles A were produced as follows. That is, a liquid was prepared in such a manner that styrene monomer, AIBN (azobisisobuthyronitrile) 0.5 parts by weight and azo-compound containing metal (BontronS34: Orient Chemical Industries Ltd.) 5 parts by weight were dissolved, and carbon black as a black pigment (MA100: Mitsubishi Chemical Co., Ltd.) 3 parts by weight were dispersed therein. Then, the thus prepared liquid was suspended and polymerized by using a surface active agent (laurylic sodium sulphate) 0.5% of tenth times amount, and then subjected to a filtrating and drying process. Then, the substantially circular particles were obtained by classifying the dried member by means of classifier (MDS-2: NIPPON PNEUMATIC MFG. CO., LTD.). The thus produced substantially circular particles constituting circular black particles having an average particle diameter of 8.9 μm and a macroscopically smooth surface and a positive charge characteristic. Then, silica H2000/4 (Wacker Ltd.) as third particles was mixed with the thus produced primary particles A by using Henshel mixer so as to produce the particles A.

The substantially circular particles constituting the particles B were produced in such a manner that acrylic urethane resin: EAU53B (Asia Industry Co., Ltd.)/IPDI cross-linking agent: Excel-Hardener HX (Asia Industry Co., Ltd.), titanium oxide 10 parts by weight, charge control agent: BontronE89 (Orient Chemical Industries Ltd.) 2 parts by weight were added, mixed and ground by a jet-mill. Further, the thus ground particles were formed to substantially circular particles by applying a mechanically impact force by means of hybridizer apparatus (Nara Machinery Co., Ltd.) and the thus formed particles were classified. The substantially circular particles constituting the thus produced primary particles B were white particles having an average particle diameter of 7.0 μm, an infinite shape, a macroscopically concavo-convex surface and a positive charge characteristic, and were used as the particles B. The estimation results were shown in the following Table 1.

COMPARATIVE EXAMPLE 13

The image display panel was manufactured according to the method of manufacturing the image display panel mentioned above, and the estimation of the display functions mentioned above was performed. In this case, the particles A and the particles B used in the Comparative example 13 were prepared as follows.

The substantially circular particles constituting the particles A were produced in such a manner that acrylic urethane resin: EAU53B (Asia Industry Co., Ltd.)/IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. Further, the thus ground particles were formed to substantially circular particles by applying a mechanically impact force by means of hybridizer apparatus (Nara Machinery Co., Ltd.) and the thus formed particles were classified so as to produce the primary particles A. The substantially circular particles constituting the thus produced primary particles A were black particles having an average particle diameter of 9.1 μm, a substantially circular shape, a macroscopically smooth surface and a negative charge characteristic, and were used as the particles A.

The substantially circular particles constituting the particles B were produced as follows. That is, a liquid was prepared in such a manner that tershally buthylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the substantially circular particles were obtained by classifying the dried member by means of classifier (MDS-2: NIPPON PNEUMATIC NFG. CO., LTD.). The thus produced substantially circular particles constituting the particles B were circular white particles having an average particle diameter of 8.5 μm, a macroscopically smooth surface and a positive charge characteristic, and were used as the particles B. The estimation results were shown in the following Table 1.

TABLE 1

|  | Example 11 | Example 12 | Comparative Example 11 | Comparative Example 12 | Comparative Example 13 |
| --- | --- | --- | --- | --- | --- |
| Particle shape of particles A | substantially circular | substantially circular | undefined shape | substantially circular | substantially circular |
| Surface condition | flat and smooth | flat and smooth | concavo-convex | flat and smooth | flat and smooth |
| Particle shape of particles B | substantially circular | substantially circular | substantially circular | undefined shape | substantially circular |
| Surface condition | flat and smooth | flat and smooth | flat and smooth | concavo-convex | flat and smooth |
| Third particles | SS20 | H2000/4 | SS20 | H2000/4 | not used |
| Particle diameter (nm) | 20 | 25 | 20 | 25 |  |
| Initial contrast ratio (1) | 8.2 | 8.0 | 7.8 | 7.9 | 8.2 |
| Contrast ratio (2) after 10000 times repetition | 7.9 | 7.8 | 7.0 | 6.7 | 6.6 |

TABLE 1-continued

|  | Example 11 | Example 12 | Comparative Example 11 | Comparative Example 12 | Comparative Example 13 |
|---|---|---|---|---|---|
| Maintaining rate (2)/(1) (%) | 96 | 98 | 89 | 85 | 80 |
| Contrast ratio (3) after 5 days left | 7.8 | 7.6 | 6.8 | 6.6 | 6.2 |
| Maintaining rate (3)/(1) (%) | 95 | 95 | 87 | 83 | 75 |

From the results shown in Table 1, it is understood that the example 11 and the example 12, in which the third particles were used and both of the particles A and the particles B had a substantially circular shape and a macroscopically smooth surface, have a maintaining rate of high contrast ratio as compared with the comparative examples 11 and 12, in which the third particles were not used and one of the particles A and the particles B had an infinite shape and a macroscopically concavo-convex surface. Therefore, it is understood that, according to the image display panel of the invention, an excellent durability during repetition use can be achieved.

<As to the Examples According to the Third Aspect of the Invention>

EXAMPLE 21

A particle agglutination state of the panel, in which white particles having a low dielectric constant and black particles having different dielectric constants with each other were sealed as the image display media, was estimated.

At first, the particles constituting the image display media were prepared as follows. The black particles having different dielectric constants, as shown in the example Nos. 1–3 and the comparative example Nos. 4 and 5 in the following Table 2, were produced by varying an additional amount of carbon black into styrene-acrylic resin.

Then, the particle sealing between the electrode substrates was performed as follows. The thus produced black particles having different dielectric constants were respectively sealed in the panel together with the white particles having a low dielectric constant, and the panels of the example Nos. 1–3 and the comparative examples 4 and 5, in which only the dielectric constants of the black particles were different, were manufactured.

The estimations were performed as follows. At first, when the particles were produced, an electric constant of the particles was measured. The measurement of a dielectric constant of overall particles was performed in such a manner that the particles were formed to a sheet shape and a capacitance of a parallel-plate capacitor using the thus formed sheet as a dielectric material. A dielectric constant was calculated on the basis of measured value, distance between the electrode substrates and area of the electrode substrate, and the thus calculated dielectric constant was defined as a dielectric constant of the particles. The measurement was performed by using impedance/gain phase analyzer: HP4194A of Hewlett-Packard Co. and electrode for measuring a dielectric member: HP16451B used as a peripheral device thereof, and here the measurement value at a frequency of 100 Hz was described.

Moreover, the estimations of the thus manufactured panels were performed in such a manner that an alternating voltage of 1 Hz/200 V was applied between two electrode substrates in the panels to be estimated, and the inner particles were reciprocated a lot of times between the electrode substrates at the same frequency as that of the applied voltage. By observing a process of reciprocating the particles, a time at which the particles stop reciprocating due to the particle agglutination was measured. This examination was continued to 10000 seconds at maximum. Then, the particles in which no agglutination occurred till the examination end were labeled as good (indicated as ○ in the following Table 2), and the particles in which agglutination occurred during the examination were labeled as no good (indicated as x in the following Table 2). The particle agglutination was determined by naked eyes. The results were shown in the following Table 2.

TABLE 2

|  |  | Example | | | Comparative Example | |
|---|---|---|---|---|---|---|
| Experiment No. | | 1 | 2 | 3 | 4 | 5 |
| Particle dielectric constant (specific dielectric constant) | white particles | 2.7 | 2.7 | 2.7 | 2.7 | 2.7 |
|  | black particles | 2.5 | 3.0 | 5.5 | 10 | 33 |
| Particle agglutination | white particles | not generated | not generated | not generated | not generated | not generated |
|  | black particles | not generated | not generated | not generated | generated | generated |
| Total determination | | ○ | ○ | ○ | X | X |

EXAMPLE 22

A particle agglutination state of the panel, in which only the black particles having different dielectric constants with each other were sealed, was estimated.

As is the same as the example 21, the black particles having different dielectric constants as shown in the example Nos. 1–3 and the comparative example Nos. 4 and 5 were produced. Then, as is the same as the example 21, only the thus produced black particles having different dielectric constants were sealed in the panel, and the panels according to the examples Nos. 1–3 and the comparative example Nos. 4 and 5, in which only the black particles having different dielectric constants were sealed, were manufactured. After that, the same estimations as those of the example 21 were performed with respect to the thus manufactured panels. The results were shown in the following Table 3.

TABLE 3

|  |  | Example | | | Comparative Example | |
|---|---|---|---|---|---|---|
| Experiment No. | | 1 | 2 | 3 | 4 | 5 |
| Particle dielectric constant (specific dielectric constant) | black particles | 2.5 | 3.0 | 5.5 | 10 | 33 |
| Particle agglutination | black particles | not generated | not generated | not generated | generated | generated |
| Total determination | | ○ | ○ | ○ | X | X |

From the results of the Table 2 and Table 3, it is understood that it is necessary to construct the particles constituting the image display media by a low dielectric insulation material having a specific inductive capacity and it is preferred to make a specific inductive capacity of the particles constituting the image display media to smaller than 5.0.

<As to the Examples According to the Fourth Aspect of the Invention>

EXAMPLE 31

Particles

By treating titanium oxide (CR-50, ISHIHARA SANGYO KAISHA, LTD.) and a binder (mixed solution of acrylic and toluene, methyl ethyl ketone, acetic ether, concentration: not larger than 1%) by means of a particle surface modifying apparatus (agglomaster, HOSOKAWA MICRON CORPORATION), the binder was coated on the titanium oxide and simultaneously an agglutination and a granulation were performed. As a result, the white particles according to the invention were obtained as agglutinated secondary particles of titanium oxide coated by acrylic having an average particle diameter of 10 μm.

After that, a reflectance (opacifying power) of the thus obtained white particles was measured. The reflectance was measured in such a manner that the white particles were scattered on a glass substrate and were measured by using Macbeth densitometer, so that it was defined as the measured reflectance per one layer. The measurement result was 57%.

COMPARATIVE EXAMPLE 31

Particles

By mixing, grounding and classifying 50 parts by weight of titanium oxide (CR-50, ISHIHARA SANGYO KAISHA, LTD.) and 100 parts by weight of acrylic resin by means of a two-axis kneader, the white particles having an average particle diameter of 9 μm in which a volume fraction of titanium oxide was 12%. With respect to the thus obtained white particles, the reflectance was measured as is the same as the example 31, and, as a result, the reflectance was 18%.

COMPARATIVE EXAMPLE 32

Particles

By mixing, grounding and classifying 100 parts by weight of titanium oxide (CR-50, ISHIHARA SANGYO KAISHA, LTD.) and 100 parts by weight of acrylic resin by means of a two-axis kneader, the white particles having an average particle diameter of 9 μm in which a volume fraction of titanium oxide was 23%. With respect to the thus obtained white particles, the reflectance was measured as is the same as the example 31, and, as a result, the reflectance was 38%.

EXAMPLE 32

Liquid Powder

By using hybridizer (Nara Machinery Co., Ltd.), the white particles of the example 31 and external additive A (silica H2000/4, Wacker Ltd.) were set therein and treated at 4800 rpm for 5 minuets, so that the external additive was fixed on a surface of the white particles to obtain the white liquid powder according to the invention. With respect to the thus obtained liquid powder, the reflectance was measured as is the same as the example 31, and, as a result, the reflectance was 59%.

COMPARATIVE EXAMPLE 33

Liquid Powder

By using hybridizer (Nara Machinery Co., Ltd.), the white particles of the comparative example 31 and external additive A (silica H2000/4, Wacker Ltd.) were set therein and treated at 4800 rpm for 5 minuets, so that the external additive was fixed on a surface of the white particles to obtain the white liquid powder. With respect to the thus obtained liquid powder, the reflectance was measured as is the same as the example 31, and, as a result, the reflectance was 19%.

COMPARATIVE EXAMPLE 34

Liquid Powder

By using hybridizer (Nara Machinery Co., Ltd.), the white particles of the comparative example 32 and external additive A (silica H2000/4, Wacker Ltd.) were set therein and treated at 4800 rpm for 5 minuets, so that the external additive was fixed on a surface of the white particles to obtain the white liquid powder. With respect to the thus obtained liquid powder, the reflectance was measured as is the same as the example 31, and, as a result, the reflectance was 40%.

<As to the Examples According to the Fifth Aspect of the Invention>

The image display panels according to the examples and the comparative examples were manufactured according to the following method and were estimated according to the following standard.

(Manufacture of the Image Display Panel)

The image display panel was manufactured as follows. At first, a substrate (7 cm×7 cm) with an electrode was prepared, and on the substrate, a rib having a height of 400 µm was produced to form a partition wall having a stripe shape.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height of the partition wall) was controlled to be 400 µm. Then, a dry photo-resist was adhered. With respect to the adhered dry photo-resist, an exposing step and an etching step were performed so as to form a mask by which a partition wall pattern having a line of 50 µm, a space of 400 µm and a pitch of 250 µm can be formed. Then, unnecessary portions were removed by a sandblast to form a predetermined partition wall having a stripe shape. Then, cells were formed between the partition walls on the substrate.

Two groups of the image display media (particles A and particles B) having different charge characteristics and different optical reflectance were prepared. Then, the substrate (opposed substrate) with the ribs was moved in a dried container having a moisture of not greater than 40% RH, the particles A as first particles were scattered in the container from a nozzle arranged at an upper portion of the container, and the scattered particles A were filled in the cells on the substrate provided at a lower portion of the container. Continuously, the particles B as second particles were scattered in the container from an another nozzle arranged at an upper portion of the container, and the scattered particles B were filled in the cells, in which the particles A were previously filled, on the substrate provided at a lower portion of the container, so that the particles B were filled on the particles A. The same amounts of the particles A and the particles B were mixed with each other, and a total volume occupying rate of the both particles with respect to a space between two substrates stacked with a distance was controlled to become 26 vol % (first embodiment) or 28 vol % (second embodiment).

Then, another substrate was sacked with the substrate in which the particles were filled in the cells, and a periphery of the substrate was adhered by means of epoxy adhesive so as to seal the particles, so that the image display panel was manufactured.

(Estimation of Display Functions)

Black color display and white color display were repeated by inversing a potential of 250V applied to the image display device installed in the image display panel manufactured. The estimation of the display function was performed in such a manner that contrast ratios at initial point, after 10000 times repetition, and after 5 days left, were measured by using a reflection image densitometer. Here, the contrast ratio was defined by contrast ratio=reflection density at black display/reflection density of white display. For reference, a maintaining rate was defined as a ratio of the contrast ratio after 10000 times repetition or after 5 days left with respect to the initial contrast ratio.

EXAMPLE 41

First Embodiment

The image display panel was manufactured according to the method of manufacturing the image display panel mentioned above, and the estimation of the display functions mentioned above was performed. In this case, the particles A and the particles B used in the Example 41 were prepared as follows.

The particles A were produced in such a manner that acrylic urethane resin: EAU53B (Asia Industry Co., Ltd.)/IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. The thus produced particles A were black particles having an average particle diameter of 9.1 µm, a macroscopically concavo-convex surface and a negative charge characteristic.

The particles B were produced as follows. That is, a liquid was prepared in such a manner that tershally buthyl-methacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC NFG. CO., LTD.). The thus produced particles B were circular white particles having an average particle diameter of 8.5 µm, a macroscopically smooth surface and a positive charge characteristic. The estimation results were shown in the following Table 4.

EXAMPLE 42

First Embodiment

The image display panel was manufactured according to the method of manufacturing the image display panel mentioned above, and the estimation of the display functions mentioned above was performed. In this case, the particles A and the particles B used in the Example 42 were prepared as follows.

The particles A were produced as follows. That is, a liquid was prepared in such a manner that styrene monomer, AIBN (azobisisobuthyronitrile) 0.5 parts by weight and azo-compound containing metal (BontronS34: Orient Chemical Industries Ltd.) 5 parts by weight were dissolved, and carbon black as a black pigment (MA100: Mitsubishi Chemical Co., Ltd.) 3 parts by weight were dispersed therein. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC MFG. CO., LTD.). The thus produced particles A had an average particle diameter of 8.9 µm and a macroscopically smooth surface and a negative charge characteristic.

The particles B were produced in such a manner that acrylic urethane resin: EAU53B (Asia Industry Co., Ltd.)/ IPDI cross-linking agent: Excel-Hardener HX (Asia Industry Co., Ltd.), titanium oxide 10 parts by weight, charge control agent: BontronE89 (Orient Chemical Industries Ltd.) 2 parts by weight were added, mixed and ground by a jet-mill. The particles B were white particles had an average particle diameter of 7.0 µm, a macroscopically concavo-convex surface and a positive charge characteristic. The estimation results were shown in the following Table 4.

EXAMPLE 43

First Embodiment

The image display panel was manufactured according to the method of manufacturing the image display panel mentioned above, and the estimation of the display functions mentioned above was performed. In this case, the particles A and the particles B used in the Example 43 were prepared as follows.

The particles A were produced as follows. At first, styrene monomer, azo compounds (5 parts by weight), charge control agent Bontron N07 (Orient Chemical Industries, Ltd.: 5 parts by weight), initiator AIBN (0.5 parts by weight) were suspended and polymerized. After that, particle sizes of the polymerized particles were classified by using a classifying device. Then, by using hybridizer (Nara Machinery Co., Ltd.), the polymerized particles, fine particle silica (H2050, Wacker Ltd.) and fine particle silica (SS20, Japan Silica Ltd.) were set therein and treated at 4800 rpm for 5 minuets, so that the fine particles were fixed on a surface of the polymerized particles by means of a mechanically impact force. The thus produced particles A were black particles having an average particle diameter of 8.2 µm, a macroscopically concavo-convex surface and a negative charge characteristic.

The particles B were produced as follows. That is, a liquid was prepared in such a manner that methylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of grinding classifier (FM-120: NIPPON PNEUMATIC NFG. CO., LTD.). The thus produced particles B were circular white particles having an average particle diameter of 7.8 µm, a macroscopically smooth surface and a positive charge characteristic. The estimation results were shown in the following Table 4.

COMPARATIVE EXAMPLE 41

First Embodiment

The image display panel was manufactured according to the method of manufacturing the image display panel mentioned above, and the estimation of the display functions mentioned above was performed. In this case, the particles A and the particles B used in the Comparative example 41 were prepared as follows.

The particles A were produced in such a manner that acrylic urethane resin: EAU53B (Asia Industry Co., Ltd.)/ IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. The thus produced particles A were black particles having an average particle diameter of 9.1 µm, a macroscopically concavo-convex surface and a negative charge characteristic.

The particles B were produced in such a manner that acrylic urethane resin: EAU53B (Asia Industry Co., Ltd.)/ IPDI cross-linking agent: Excel-Hardener HX (Asia Industry Co., Ltd.), titanium oxide 10 parts by weight, charge control agent: BontronE89 (Orient Chemical Industries Ltd.) 2 parts by weight were added, mixed and ground by a jet-mill. The thus produced particles B were white particles having an average particle diameter of 7.0 µm, a macroscopically concavo-convex surface and a positive charge characteristic. The estimation results were shown in the following Table 4.

COMPARATIVE EXAMPLE 42

The image display panel was manufactured according to the method of manufacturing the image display panel mentioned above, and the estimation of the display functions mentioned above was performed. In this case, the particles A and the particles B used in the Comparative example 42 were prepared as follows.

The particles A were produced as follows. That is, a liquid was prepared in such a manner that styrene monomer, AIBN (azobisisobuthyronitrile) 0.5 parts by weight and azo-compound containing metal (BontronS34: Orient Chemical Industries Ltd.) 5 parts by weight were dissolved, and carbon black as a black pigment (MA100: Mitsubishi Chemical Co., Ltd.) 3 parts by weight were dispersed therein. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC MFG. CO., LTD.). The thus produced particles A had an average particle diameter of 8.9 µm and a macroscopically smooth surface and a negative charge characteristic.

The particles B were produced as follows. That is, a liquid was prepared in such a manner that tershally buthylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC NFG. CO., LTD.). The thus produced particles B were circular white particles having an average particle diameter of 8.5 µm, a macroscopically smooth surface and a positive charge characteristic. The estimation results were shown in the following Table 4.

TABLE 4

|  | Example 41 | Example 42 | Example 43 | Comparative Example 41 | Comparative Example 42 |
|---|---|---|---|---|---|
| Macroscopic concavo-convex on surface of particles A | existed | not existed | existed | existed | not existed |
| Macroscopic concavo-convex on surface of particles B | not existed | existed | not existed | existed | not existed |
| Surface concavo-convex condition | crushed surface | crushed surface | fixing of fine particles | crushed surface | flat and smooth |
| Fixing method of fine particles | — | — | hybridizer | — | — |
| Initial contrast ratio (1) | 8.2 | 8.2 | 8.2 | 8.2 | 8.2 |
| Contrast ratio (2) after 10000 times repetition | 7.9 | 8.0 | 8.0 | 6.6 | 7.0 |
| Maintaining rate (2)/(1) (%) | 96 | 98 | 98 | 80 | 85 |
| Contrast ratio (3) after 5 days left | 7.8 | 7.9 | 8.0 | 6.2 | 6.8 |
| Maintaining rate (3)/(1) (%) | 95 | 96 | 98 | 76 | 83 |

From the results shown in Table 4, it is understood that the examples 41–43, in which one particles have a surface on which a macroscopic concavo-convex portion exists and the other particles have a surface on which no macroscopic concavo-convex portion exists, have a maintaining rate of high contrast ratio in each time as compared with the comparative example 41, in which both particles have a surface on which a macroscopic concavo-convex portion exists, and, the comparative example 42, in which both particles have a surface on which no macroscopic concavo-convex portion exists. From these results, it is understood that, according to the image display panel of the first embodiment of the fifth aspect of the invention, an excellent durability during repetition use can be achieved.

EXAMPLE 51

Second Embodiment

The image display panel was manufactured according to the method of manufacturing the image display panel mentioned above, and the estimation of the display functions mentioned above was performed. In this case, the particles A and the particles B used in the Example 51 were prepared as follows.

The particles A were produced in such a manner that acrylic urethane resin: EAU53B (Asia Industry Co., Ltd.)/IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. The thus produced particles A were black particles having an average particle diameter of 9.1 µm, a macroscopically concavo-convex surface and a negative charge characteristic.

The particles B were produced as follows. That is, a liquid was prepared in such a manner that tershally butylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC NFG. CO., LTD.). The thus produced particles B were circular white particles having an average particle diameter of 8.5 µm, a macroscopically smooth surface and a positive charge characteristic. The estimation results were shown in the following Table 4. Then, fine particle silica (H2050, Wacker Ltd.) having a negative charge characteristic was mixed with the thus produced circular white particles by using Henshel mixer so as to adhere the fine particle silica in an electrostatic manner to a surface of the circular white particles, so that the particles B were produced. The thus produced particles B were white particles having a positive charge characteristic in which fine particles were fixed to a particle surface on which no macroscopic concavo-convex portion exists. The estimation results were shown in the following Table 5.

COMPARATIVE EXAMPLE 52

Second Embodiment

The image display panel was manufactured according to the method of manufacturing the image display panel mentioned above, and the estimation of the display functions mentioned above was performed. In this case, the particles A and the particles B used in the Comparative example 52 were prepared as follows.

The particles A were produced as follows. That is, a liquid was prepared in such a manner that styrene monomer, AIBN (azobisisobuthyronitrile) 0.5 parts by weight and azo-compound containing metal (BontronS34: Orient Chemical Industries Ltd.) 5 parts by weight were dissolved, and carbon black as a black pigment (MA100: Mitsubishi Chemical Co., Ltd.) 3 parts by weight were dispersed therein. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC MFG. CO., LTD.). The thus produced particles A had an average particle diameter of 8.9 µm and a macroscopically smooth surface and a negative charge characteristic. Then, fine particle titanium oxide having a positive charge characteristic was mixed with the thus produced circular black particles by using Henshel mixer so as to adhere the fine particle in an electrostatic manner to a surface of the circular black particles, so that the particles A were produced. The thus produced particles A were black particles having a negative charge characteristic in which fine particles were fixed to a particle surface on which no macroscopic concavo-convex portion exists.

The particles B were produced in such a manner that acrylic urethane resin: EAU53B (Asia Industry Co., Ltd.)/IPDI cross-linking agent: Excel-Hardener HX (Asia Industry Co., Ltd.), titanium oxide 10 parts by weight, charge control agent: BontronE89 (Orient Chemical Industries Ltd.) 2 parts by weight were added, mixed and ground by a jet-mill. The particles B were white particles had an average particle diameter of 7.0 μm, a macroscopically concavo-convex surface and a positive charge characteristic. The estimation results were shown in the following Table 5.

COMPARATIVE EXAMPLE 51

Second Embodiment

The image display panel was manufactured according to the method of manufacturing the image display panel mentioned above, and the estimation of the display functions mentioned above was performed. In this case, the particles A and the particles B used in the Comparative example 51 were prepared as follows.

The particles A were produced in such a manner that acrylic urethane resin: EAU53B (Asia Industry Co., Ltd.)/IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. The thus produced particles A were black particles having an average particle diameter of 9.1 μm, a macroscopically concavo-convex surface and a negative charge characteristic.

The particles B were produced in such a manner that acrylic urethane resin: EAU53B (Asia Industry Co., Ltd.)/IPDI cross-linking agent: Excel-Hardener HX (Asia Industry Co., Ltd.), titanium oxide 10 parts by weight, charge control agent: BontronE89 (Orient Chemical Industries Ltd.) 2 parts by weight were added, mixed and ground by a jet-mill. The thus produced particles B were white particles having an average particle diameter of 7.0 μm, a macroscopically concavo-convex surface and a positive charge characteristic. The estimation results were shown in the following Table 5.

COMPARATIVE EXAMPLE 52

Second Embodiment

The image display panel was manufactured according to the method of manufacturing the image display panel mentioned above, and the estimation of the display functions mentioned above was performed. In this case, the particles A and the particles B used in the Comparative example 52 were prepared as follows.

The particles A were produced as follows. That is, a liquid was prepared in such a manner that styrene monomer, AIBN (azobisisobuthyronitrile) 0.5 parts by weight and azo-compound containing metal (BontronS34: Orient Chemical Industries Ltd.) 5 parts by weight were dissolved, and carbon black as a black pigment (MA100: Mitsubishi Chemical Co., Ltd.) 3 parts by weight were dispersed therein. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC MFG. CO., LTD.). The thus produced particles A had an average particle diameter of 8.9 μm and a macroscopically smooth surface and a negative charge characteristic.

The particles B were produced as follows. That is, a liquid was prepared in such a manner that tershally buthylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC NFG. CO., LTD.). The thus produced particles B were circular white particles having an average particle diameter of 8.5 μm, a macroscopically smooth surface and a positive charge characteristic. The estimation results were shown in the following Table 5.

TABLE 5

|  | Example 51 | Example 52 | Comparative Example 51 | Comparative Example 52 |
| --- | --- | --- | --- | --- |
| Macroscopic concavo-convex on surface of particles A | existed | not existed | existed | not existed |
| Macroscopic concavo-convex on surface of particles B | not existed | existed | existed | not existed |
| Fine particles (third particles) | existed | existed | not existed | not existed |
| Charge polarity of particles having no macroscopic concavo-convex | positive | negative | — | — |
| Charge polarity of fine particles (third particles) | negative | positive | — | — |
| Charge polarity of particles having no macroscopic concavo-convex to which fine particles are adhered | positive | negative | — | — |

TABLE 5-continued

|  | Example 51 | Example 52 | Comparative Example 51 | Comparative Example 52 |
| --- | --- | --- | --- | --- |
| Initial contrast ratio (1) | 8.0 | 8.0 | 8.0 | 8.0 |
| Contrast ratio (2) after 10000 times repetition | 7.7 | 7.8 | 6.4 | 6.2 |
| Maintaining rate (2)/(1) (%) | 96 | 98 | 80 | 78 |
| Contrast ratio (3) after 5 days left | 7.6 | 7.7 | 6.0 | 6.0 |
| Maintaining rate (3)/(1) (%) | 95 | 96 | 75 | 75 |

From the results shown in Table 5, it is understood that the examples 51 and 52, in which one particles have a surface on which a macroscopic concavo-convex portion exists and the other particles have a surface on which no macroscopic concavo-convex portion exists, and further in which the fine particles were adhered in an electrostatic manner to its surface, have a maintaining rate of high contrast ratio in each time as compared with the comparative example 51, in which both particles have a surface on which a macroscopic concavo-convex portion exists and further in which the fine particles for adhering in electrostatic manner were not used, and, the comparative example 52, in which both particles have a surface on which no macroscopic concavo-convex portion exists. From these results, it is understood that, according to the image display panel of the second embodiment of the fifth aspect of the invention, an excellent durability during repetition use can be achieved.

<As to the Examples According to the Sixth Aspect of the Invention>

EXAMPLE 61

White Particles

The white particles according to the examples Nos. 1–5 of the invention were produced in such a manner that, with respect to 100 parts by weight of base resin: PMMA (Delpet 80NH, Asahi Kasei Chemicals Corporation, specific gravity of 1.19), as shown in the following Table 6, 100 parts by weight, 200 parts by weight or 300 parts by weight of titanium oxide as a white pigment: TIPAQUE CR95, ISHIHARA SANGYO KAISHA LTD. (specific gravity of 4.0), 10–60 parts by weight of hollow particles: SX866(A), JSR (outer diameter of 0.3 μm (primary particles), inner diameter of 0.2 μm, cross-linking styrene-acrylic), and the others such as CCA, various fillers (same amount in every members) were added, mixed and further ground/classified by a jet-mill.

The white particles according to the comparative example Nos. 1–4 were produced in such a manner that, with respect to 100 parts by weight of the base resin mentioned above, as shown in the following Table 6, 100–300 parts by weight of titanium oxide mentioned above and the others such as CCA, various fillers (same amount in every members) were added, mixed and further ground/classified by a jet-mill.

With respect to the thus obtained white particles according to the examples and the comparative examples, a white reflectance (whiteness) was measured. The measurement of the white reflectance was performed in such a manner that the particles were arranged densely on a surface of a glass substrate and were measured from an outside of the glass substrate having a transparent electrode made of ITO with a thickness of 1.1 mm arranged on the particles, so that it was defined as the measured white reflectance per one layer formed by the particles with a thickness of 10 μm. Moreover, a volume filling rate was defined as [(volume of titanium oxide+volume of hollow particles)/(volume of overall particles (resin+titanium oxide+hollow particles))×100. The results were shown in the following Table 6.

TABLE 6

| Experiment No. |  | Titanium oxide (parts by weight) | Hollow particles (parts by weight) | Volume fill ratio (%) | Whiteness (%) |
| --- | --- | --- | --- | --- | --- |
| Example | 1 | 100 | 60 | 55.3 | 45.5 |
|  | 2 | 200 | 10 | 42.9 | 47.2 |
|  | 3 | 200 | 30 | 51.6 | 48.0 |
|  | 4 | 200 | 50 | 57.9 | 47.0 |
|  | 5 | 300 | 20 | 54.7 | 45.2 |
| Comparative Example | 1 | 100 | — | 22.9 | 42.6 |
|  | 2 | 150 | — | 30.9 | 45.9 |
|  | 3 | 200 | — | 37.3 | 46.4 |
|  | 4 | 300 | — | 47.2 | 44.2 |

From the results shown in Table 6, it is understood that the examples Nos. 1–5 according to the invention, in which 10–50 parts by weight of the hollow particles were filled, improved the whiteness by 45% as compared with the comparative examples Nos. 1–4, in which the hollow particles were not filled.

EXAMPLE 62

Liquid Powder

By using hybridizer (Nara Machinery Co., Ltd.), the white particles of the example 3 (200 parts by weight of titanium oxide, 30 part by weight of the hollow particles) having an average particle diameter of about 10 μm, external additive A (silica H2000/4, Wacker Ltd.) and external additive B (silica SS20, Japan Silica Ltd.) were set therein and treated at 4800 rpm for 5 minuets, so that the external additive was fixed on a surface of the white particles to obtain the white liquid powder according to the invention. With respect to the thus obtained white liquid powder, the whiteness was measured, and, as a result, the whiteness was an excellent value over 45%. As to the estimations of the volume filling rate and the panels, the same results as that of the example 62 were obtained.

<As to the Examples According to the Seventh Aspect of the Invention>

EXAMPLE 71

At first, as shown in the following Table 7 indicating composition ratio, thermosetting resin as the base resin: polyester resin (for PCM powder applying)+U-PiCA coat GV-570 (Japan U-PiCA Company, Ltd.) of block isocyanate group. Bridging agent: Bestagon B1530 (DEGUSSA CORPORATION), hardening catalyst: Neostan U-100 (NITTO CHEMICAL INDUSTRY co., ltd.), titanium oxide: TAIPAQUE CR-95 (ISHIHARA SANGYO KAISHA, LTD.), CCA: BontronE-84 (Orient Chemical Industries Ltd.) were mixed by a two-axis kneader so as to obtain a compound. A temperature of kneading was 120° C. Then, the thus obtained compound was subjected to a heat press under 200° C.×10 minutes so as to harden the thermosetting resin as the base resin by a heat cross-linking effect. After that, it was ground finely by a jet-mill, and the particles according to the example Nos. 1–4 were obtained.

In the same manner, as shown in the following Table 7 indicating composition ratio, polystyrene resin (PS) as a thermoplastic resin of the base resin: Toyo-styrol MW1C (Toyo styrene co., ltd.), titanium oxide: TAIPAQUE CR-95 (ISHIHARA SANGYO KAISHA LTD.), CCA: BontronE-84 (Orient Chemical Industries Ltd.) were mixed by a two-axis kneader so as to obtain a compound. A temperature of kneading was 180° C. Then, the thus obtained compound was ground finely by a jet-mill directly, and the particles according to the comparative example No. 1 was obtained.

With respect to the thus obtained example Nos. 1–4 and the thus obtained comparative example No. 1, a hardening reaction was performed by means of a sheet mold having a dimension of 150 mm×150 mm×2.5 mm. After that, a temperature was gradually increased, and a temperature at which the particles start to deform and a temperature at which the particles start to melt and adhere to the glass substrate were measured. The results were shown in the following Table 7.

(Manufacture of the Image Display Panel)

The image display panel was manufactured as follows.

At first, a substrate (7 cm×7 cm) with an electrode was prepared, and on the substrate, a rib having a height of 400 μm was produced to form a partition wall having a stripe shape.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height of the partition wall) was controlled to be 400 μm. Then, a dry photo-resist was adhered. With respect to the adhered dry photo-resist, an exposing step and an etching step were performed so as to form a mask by which a partition wall pattern having a line of 50 μm, a space of 400 μm and a pitch of 250 μm can be formed. Then, unnecessary portions were removed by a sandblast to form a predetermined partition wall having a stripe shape.

Two groups of the image display media (white particles A and black particles B) having different charge characteristics and different optical reflectance were prepared. Then, the substrate (opposed substrate) with the ribs was moved in a dried container having a moisture of not greater than 40% RH, the particles A as first particles were scattered in the container from a nozzle arranged at an upper portion of the container, and the scattered particles A were filled in the cells on the substrate provided at a lower portion of the container.

TABLE 7

| Experiment No. | | Material (parts by weight) | | | | Starting temperature (° C.) | |
|---|---|---|---|---|---|---|---|
| | resin | cross-linking agent | TiO$_2$ | catalyst | CCA | deformation | bond melting |
| Example 1 | 100 | 10 | — | 0.5 | — | 115 | 98 |
| 2 | 100 | 10 | 100 | 0.5 | — | 118 | 103 |
| 3 | 100 | 20 | 100 | 0.5 | — | 123 | 103 |
| 4 | 100 | 20 | 100 | 0.5 | 5 | 123 | 103 |
| Comparative Example 1 | 100 | — | 100 | — | 5 | 80 | 75 |

From the results shown in Table 7, it is understood that the example Nos. 1–4, in which the thermosetting resin was subjected to a heat cross-linking and hardened, showed no deformation and no melting/adhering to a high temperature and improved a heat resistance extraordinarily as compared with the comparative example No. 1, in which the thermoplastic resin was used.

In the explanations mentioned above, the base resin of the particles are described, but it is a matter of course that the same effects can be obtained in the liquid powder utilizing the particles according to the invention.

<As to the Examples According to the Eighth Aspect of the Invention>

The image display panels manufactured according to the examples and the comparative examples were estimated according to the following standard.

Continuously, the particles B as second particles were scattered in the container from an another nozzle arranged at an upper portion of the container, and the scattered particles B were filled in the cells, in which the particles A were previously filled, on the substrate provided at a lower portion of the container, so that the particles B were filled on the particles A.

The same amounts of the particles A and the particles B were mixed with each other, and a total volume occupying rate of the both particles with respect to a space between two substrates stacked with a distance was controlled to become 26 vol %.

Then, another substrate was sacked with the substrate in which the particles were filled in the cells, and a periphery of the substrate was adhered by means of epoxy adhesive so as to seal the particles, so that the image display panel was manufactured.

(Estimation of Display Functions)

Black color display and white color display were repeated by inversing a potential of 250V applied to the image display device installed in the image display panel manufactured. The estimation of the display function was performed in such a manner that contrast ratios and reflection densities at initial point, after 10000 times repetition, and after 100000 times repetition, were measured by using a reflection image densitometer. Here, the contrast ratio was defined by contrast ratio=reflection density at black display/reflection density of white display.

EXAMPLE 81

The particles (particles A, particles B) as two groups of the image display media were produced.

The particles A were produced in such a manner that acrylic urethane resin: EAU53B (Asia Industry Co., Ltd.)/ IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill to obtain primary particles. Then, the thus obtained primary particles were made to be a sheet by means of a heat press at 140° C., and the sheet was drawn under a heat by means of a drawing machine, so that a sheet having a thickness of 8 µm was obtained. Then, the thus drawn sheet was finely ground, and a surface of the ground pieces was melted by a hot air having a temperature of 450° C. by means of Safusion system (SFS-03: NIPPON PNEUMATIC MFG. CO., LTD.), so that the particles having a flat round shape were obtained. The thus produced particles were flat round black particles having a negative charge characteristic and an average particle diameter of 9.4 µm.

The particles B were produced in such a manner that acrylic urethane resin: EAU53B (Asia Industry Co., Ltd.)/ IPDI cross-linking agent: Excel-Hardener HX (Asia Industry Co., Ltd.), titanium oxide 10 parts by weight, charge control agent: BontronE89 (Orient Chemical Industries Ltd.) 2 parts by weight were added, mixed and ground according to the same producing method as that of the particles A. The thus produced particles B were flat round white particles having a positive charge characteristic and an average particle diameter of 9.0 µm.

By using the image display device in which the image display panel utilizing the thus produced particles was installed, the display functions were estimated. The results were shown in the following Table 8.

EXAMPLE 82

The particles A were produced in such a manner that acrylic urethane resin: EAU53B (Asia Industry Co., Ltd.)/ IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. The thus produced particles A were black particles having a negative charge characteristic and an average particle diameter of 9.0 µm.

As the particles B, the flat round white particles produced in the example 81 having a positive charge characteristic and an average particle diameter of 9.0 µm were used.

By using the image display device in which the image display panel utilizing the thus produced particles was installed, the display functions were estimated. The results were shown in the following Table 8.

EXAMPLE 83

As the particles A, the flat round black particles produced in the example 81 having a negative charge characteristic and an average particle diameter of 9.4 µm were used. The particles B were produced as follows. That is, a liquid was prepared in such a manner that tershally buthylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC MFG. CO., LTD.). The thus produced particles B were circular white particles having a positive charge characteristic and an average particle diameter of 8.5 µm.

By using the image display device in which the image display panel utilizing the thus produced particles was installed, the display functions were estimated. The results were shown in the following Table 8.

COMPARATIVE EXAMPLE 81

The particles A were produced as follows. That is, a liquid was prepared in such a manner that styrene monomer, AIBN (azobisisobuthyronitrile) 0.5 parts by weight and azo-compound containing metal (BontronS34: Orient Chemical Industries Ltd.) 5 parts by weight were dissolved, and carbon black as a black pigment (MA100: Mitsubishi Chemical Co., Ltd.) 3 parts by weight were dispersed therein. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC MFG. CO., LTD.). The thus produced particles A were circular black particles having a negative charge characteristic and an average particle diameter of 8.9 µm.

The particles B were produced as follows. That is, a liquid was prepared in such a manner that tershally buthylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the particles were obtained by classifying the dried member by means of classifier (MDS-2: NIPPON PNEUMATIC MFG. CO., LTD.). The thus produced particles B were circular white particles having a positive charge characteristic and an average particle diameter of 8.5 µm.

By using the image display device in which the image display panel utilizing the thus produced particles was installed, the display functions were estimated. The results were shown in the following Table 8.

TABLE 8

|  | Example 81 | Example 82 | Example 83 | Comparative Example 81 |
|---|---|---|---|---|
| Shape of particles A (white) | flat round | flat round | circular | circular |
| Shape of particles B (black) | flat round | circular | flat round | circular |
| Initial white reflection density (%) | 42 | 42 | 38 | 38 |
| Initial contrast ratio | 8.2 | 8.2 | 7.9 | 7.9 |
| White reflection density after 10000 times repetition (%) | 42 | 42 | 36 | 36 |
| Contrast ratio after 10000 times repetition | 8.0 | 7.9 | 7.6 | 6.8 |
| White reflection density after 100000 times repetition (%) | 40 | 38 | 34 | 34 |
| Contrast ratio after 100000 times repetition | 7.8 | 7.7 | 7.4 | 6.2 |

From the results shown in Table 8, it is understood that, in the examples 81 and 82 utilizing the particles A (white color) having a flat round shape, the initial white reflection density was high, and a decrease of the white reflection density and a decrease of the contrast ratio after repeated inversion displays were both small. Moreover, it is understood that, in the example 83 utilizing the particles B (black color) having a flat round shape, the initial white reflection density was low as compared with the examples 81 and 82 utilizing the particles A (white color) having a flat round shape, but a decrease of the white reflection density and a decrease of the contrast ratio after repeated inversion displays were both small. Further, it is understood that, in the comparative example 81 utilizing the particles A (white color) and the particles B (black color) both having no flat round shape, the initial white reflection density was low and a decrease of the white reflection density and a dectease of the contrast ratio after repeated inversion displays were both large. That is, it is understood that it is preferred that a particle shape of at least one of the particles had a flat round shape, and it is especially preferred that the white color particles had a flat round shape.

<As to the Examples According to the Ninth Aspect of the Invention>

The image display panels manufactured according to the examples and the comparative examples were estimated according to the following standard.

(Manufacture of the Image Display Panel)

The image display panel was manufactured as follows. At first, a substrate (7 cm×7 cm) with an electrode was prepared, and on the substrate, a rib having a height of 400 μm was produced to form a partition wall having a stripe shape.

The production of the rib was performed as follows. As an inorganic powder, a glass powder was prepared by melting, cooling and grinding a mixture of $SiO_2$, $Al_2O_3$, $B_2O_3$, $Bi_2O_3$, and ZnO. As a resin, epoxy resin having a heat hardening property was prepared. Then, the glass powder and the epoxy resin were mixed with a solvent and controlled to be a viscosity of 12000 cps, so that a paste was produced. Then, the paste was applied on the substrate and heated at 150° C. to be hardened. By repeating the above paste applying and heating steps, a thickness (corresponding to a height of the partition wall) was controlled to be 400 μm. Then, a dry photo-resist was adhered. With respect to the adhered dry photo-resist, an exposing step and an etching step were performed so as to form a mask by which a partition wall pattern having a line of 50 μm, a space of 400 μm and a pitch of 250 μm can be formed. Then, unnecessary portions were removed by a sandblast to form a predetermined partition wall having a stripe shape.

Two groups of the image display media (white particles A and black particles B) having different charge characteristics and different colors were prepared. Then, the substrate (opposed substrate) with the ribs was moved in a dried container having a moisture of not greater than 40% RH, the particles A as first particles were scattered in the container from a nozzle arranged at an upper portion of the container, and the scattered particles A were filled in the cells on the substrate provided at a lower portion of the container.

Continuously, the particles B as second particles were scattered in the container from an another nozzle arranged at an upper portion of the container, and the scattered particles B were filled in the cells, in which the particles A were previously filled, on the substrate provided at a lower portion of the container, so that the particles B were filled on the particles A.

The same amounts of the particles A and the particles B were mixed with each other, and a total volume occupying rate of the both particles with respect to a space between two substrates stacked with a distance was controlled to become 25 vol %.

Then, another substrate was sacked with the substrate in which the particles were filled in the cells, and a periphery of the substrate was adhered by means of epoxy adhesive so as to seal the particles, so that the image display panel was manufactured.

(Estimation of Display Functions)

Black color display and white color display were repeated by inversing a potential of 250V applied to the image display device installed in the image display panel manufactured. The estimation of the display function was performed in such a manner that contrast ratios and reflection densities at initial point, after 10000 times repetition, and after 100000 times repetition, were measured by using a reflection image densitometer. Here, the contrast ratio was defined by contrast ratio=reflection density at black display/reflection density of white display.

EXAMPLE 91

The particles (particles A, particles B) as two groups of the image display media were produced.

The particles A were produced in such a manner that acrylic urethane resin: EAU53B (Asia Industry Co., Ltd.)/IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. The thus produced particles A were black particles having a negative charge characteristic and an average particle diameter of 8.1 μm. Further, a part of the particles was selected as a sample and was observed by a microscope. As a result, the particles having an average particle diameter of over 10 μm were observed.

The particles B were produced in such a manner that acrylic urethane resin: EAU53B (Asia Industry Co., Ltd.)/IPDI cross-linking agent: Excel-Hardener HX (Asia Industry Co., Ltd.), titanium oxide 10 parts by weight, charge control agent: BontronE89 (Orient Chemical Industries Ltd.) 2 parts by weight were added, mixed and ground by a jet-mill. The thus produced particles B were white particles having a positive charge characteristic and an average particle diameter of 9.7 µm. Further, a part of the particles was selected as a sample and was observed by a microscope. As a result, the particles having an average particle diameter of lower than 8 µm were observed.

By using the image display device in which the image display panel utilizing the thus produced particles was installed, the display functions were estimated. The results were shown in the following Table 9.

EXAMPLE 92

The particles A were produced in such a manner that acrylic urethane resin: EAU53B (Asia Industry Co., Ltd.)/ IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. Then, the thus obtained particles were subjected to an over-cut classification by using a classifier (MDS-2: NIPPON PNEUMATIC MFG. CO., LTD.) in such a manner that the particles having an average particle diameter of over 10 µm were removed. The thus produced particles A were black particles having a negative charge characteristic and an average particle diameter of 7.41 µm. Further, a part of the particles was selected as a sample and was observed by a microscope. As a result, the particles having an average particle diameter of over 10 µm were not observed.

The particles B were produced in such a manner that acrylic urethane resin: EAU53B (Asia Industry Co., Ltd.)/ IPDI cross-linking agent: Excel-Hardener HX (Asia Industry Co., Ltd.), titanium oxide 10 parts by weight, charge control agent: BontronE89 (Orient Chemical Industries Ltd.) 2 parts by weight were added, mixed and ground by a jet-mill. Then, the thus obtained particles were subjected to an under-cut classification by using a classifier (MDS-2: NIPPON PNEUMATIC MFG. CO., LTD.) in such a manner that the particles having an average particle diameter of lower than 8 µm were removed. The thus produced particles B were white particles having a positive charge characteristic and an average particle diameter of 9.8 µm. Further, a part of the particles was selected as a sample and was observed by a microscope. As a result, the particles having an average particle diameter of lower than 8 µm were not observed.

By using the image display device in which the image display panel utilizing the thus produced particles was installed, the display functions were estimated. The results were shown in the following Table 9.

EXAMPLE 93

As the particles A, the black particles produced according to the example 92 having an average particle diameter of 7.4 µm, in which the particles having an average particle diameter of over 10 µm were removed by the over-cut classification, were used.

The particles B were produced as follows. That is, a liquid was prepared in such a manner that tershally butylmethacrylate monomer 80 parts by weight, methacrylic acid 2-(diethylamino) ethyl monomer 20 parts by weight, AIBN (azobisisobuthyronitrile) 0.5 parts by weight were dissolved, and titanium oxide treated by a coupling agent so as to be oleophic state 20 parts by weight was dispersed in the dissolved liquid. Then, the thus prepared liquid was suspended and polymerized by using a surface active agent (laurylic sodium sulphate) 0.5% of tenth times amount, and then subjected to a filtrating and drying process. Then, the particles were subjected to an under-cut classification by using a classifier (MDS-2: NIPPON PNEUMATIC MFG. CO., LTD.) in such a manner that the particles having an average particle diameter of lower than 8 µm were removed. The thus produced particles B were white particles having a positive charge characteristic and an average particle diameter of 9.6 µm. Further, a part of the particles was selected as a sample and was observed by a microscope. As a result, the particles having an average particle diameter of lower than 8 µm were not observed.

By using the image display device in which the image display panel utilizing the thus produced particles was installed, the display functions were estimated. The results were shown in the following Table 9.

EXAMPLE 94

The particles A were produced in such a manner that acrylic urethane resin: EAU53B (Asia Industry Co., Ltd.)/ IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. The thus produced particles A were black particles having a negative charge characteristic and an average particle diameter of 5.2 µm.

The particles B were produced in such a manner that acrylic urethane resin: EAU53B (Asia Industry Co., Ltd.)/ IPDI cross-linking agent: Excel-Hardener HX (Asia Industry Co., Ltd.), titanium oxide 10 parts by weight, charge control agent: BontronE89 (Orient Chemical Industries Ltd.) 2 parts by weight were added, mixed and ground by a jet-mill. The thus produced particles B were white particles having a positive charge characteristic and an average particle diameter of 11.3 µm.

By using the image display device in which the image display panel utilizing the thus produced particles was installed, the display functions were estimated. The results were shown in the following Table 9.

COMPARATIVE EXAMPLE 91

The particles A were produced in such a manner that acrylic urethane resin: EAU53B (Asia Industry Co., Ltd.)/ IPDI cross-linking agent: Excel-Hardener HX (Asia Industry Co., Ltd.), Carbon Black (MA100: Mitsubishi Chemical Co., Ltd.) 4 parts by weight, charge control agent: BontronN07 (Orient Chemical Industries Ltd.) 2 parts by weight were added, mixed and ground by a jet-mill. The thus produced particles A were black particles having a negative charge characteristic and an average particle diameter of 9.5 µm.

The particles B were produced in such a manner that acrylic urethane resin: EAU53B (Asia Industry Co., Ltd.)/ IPDI cross-linking agent: Excel-Hardener HX (Asia Industry Co., Ltd.), titanium oxide 10 parts by weight, charge control agent: BontronE89 (Orient Chemical Industries Ltd.) 2 parts by weight were added, mixed and ground by a jet-mill. The thus produced particles B were white particles having a positive charge characteristic and an average particle diameter of 8.2 µm.

By using the image display device in which the image display panel utilizing the thus produced particles was installed, the display functions were estimated. The results were shown in the following Table 9.

TABLE 9

| | | Example 91 | Example 92 | Example 93 | Example 94 | Comparative Example 91 |
|---|---|---|---|---|---|---|
| Average particle diameter Ddark of deep dark color particles A (black) (μm) | | 8.1 | 7.4 | 7.4 | 5.2 | 9.5 |
| Average particle diameter Ddark of pale bright color particles B (white) (μm) | | 9.7 | 9.8 | 9.6 | 11.3 | 8.2 |
| Dbright/Ddark | | 1.20 | 1.32 | 1.30 | 2.2 | 0.86 |
| Classification method | deep dark color particles A | crushing classification | crushing classification + over-cut classification | crushing classification + over-cut classification | crushing classification | crushing classification |
| | pale bright particles B | crushing classification | crushing classification + under-cut classification | crushing classification + under-cut classification | crushing classification | crushing classification |
| Initial white reflection density (%) | | 38 | 42 | 40 | 33 | 27 |
| Initial contrast ratio | | 5.2 | 6.0 | 5.7 | 5.0 | 4.9 |
| White reflection density after 10000 times repetition (%) | | 36 | 41 | 38 | 31 | 26 |
| Contrast ratio after 10000 times repetition (%) | | 5.1 | 5.8 | 5.6 | 4.9 | 4.7 |
| White reflection density after 100000 times repetition (%) | | 33 | 38 | 36 | 27 | 22 |
| Contrast ratio after 100000 times repetition (%) | | 4.8 | 5.5 | 5.2 | 4.4 | 3.8 |

From the results shown in Table 9, it is understood that, in the examples 91, 92, 93 and 94 in which a relation of average particle diameters was set to Ddark<Dbright, the initial white reflection density was high, and a decrease of the white reflection density and a decrease of the contrast ratio after repeated inversion displays were both small. Moreover, it is understood that, in the examples 92 and 93 in which the over-cut classification/the under-cut classification was performed by using classifier (MDS-2: NIPPON PNEUMATIC MFG. CO., LTD.), the initial white reflection density was high, and a decrease of the white reflection density and a decrease of the contrast ratio after repeated inversion displays were both small, as compared with the example 91 in which the over-cut classification/the under-cut classification was not performed. Further, it is understood that, in the example 94 in which a relation of average particle diameters satisfied Dbright/Ddark>2, better results were obtained on the initial white reflection density, a decrease of the white reflection density and a decrease of the contrast ratio after repeated inversion displays, as compared with the comparative example 91, but little worse results were obtained as compared with the results of the examples 91–93 in which a relation satisfied Dbright/Ddark<2. Furthermore, it is understood that, in the comparative example 91 in which a relation of average particle diameters did not satisfy Ddark<Dbright, the initial white reflection density was low, and a decrease of the white reflection density and a decrease of the contrast ratio after repeated inversion displays were large.

<As to the Examples According to the Tenth Aspect of the Invention>

At first, as shown in the following Table 10 indicating composition ratio, PBT as the base resin (Toraycon 1401×31, Toray Industries, Inc.), MgO as metal oxide (Starmag L-10, Konoshima Chemical Co., Ltd.), C/B as the pigment (SpecialBlack-4, DEGUSSA CORPORATION), were mixed by a two-axis kneader so as to obtain a compound. A temperature of kneading was 240° C. After that, the thus obtained compound was finely ground by a jet-mill, so that the particles according to the examples 101 and 103 of the invention were obtained.

In the same manner, as shown in the following Table 10 indicating composition ratio, PBT as the base resin (Toraycon 1401×31, Toray Industries, Inc.), magnesium stearate as fatty acid metal salt (reagent grade, NOF CORPORATION), C/B as the pigment (N-660, Asahi Carbon Co., Ltd.) were mixed in the same manner as that of the above example to obtain the particles according to the example 102. On the other hand, for reference, as shown in the following Table 10 indicating composition ratio, PBT as the base resin (Toraycon 1401×31, Toray Industries, Inc.), C/B as the pigment (SpecialBlack-4, DEGUSSA CORPORATION), were mixed Without using metal oxide and fatty acid metal salt in the same manner as that of the above example to obtain the comparative example 1.

With respect to the thus obtained examples 101–103 and the comparative example 101, an average particle diameter of the particles was measured in the same manner as that of the above explanation, and a blow-off charge amount of the particles was measured according to the following method. The results were shown in the following Table 10. The blow-off measurement theory and method are as follows. In the blow-off method, a mixture of the powders and the carriers are placed into a cylindrical container with nets at both ends, and high-pressure gas is blown from the one end to separate the powders and the carriers, and then only the powders are blown off from the mesh of the net. In this occasion, charge amount of reverse blown polarity remains on the carriers with the same charge amount of the powders carried away out of the container. Then, all of electric flux by this electric charge are collected to Faraday cage, and are charged across a capacitor with this amount. Accordingly, the charge amount of the particles is determined as Q=CV (C: capacity, V: voltage across both ends of the capacitor) by measuring potential of both ends of the capacitor.

In the invention, as a blow-off powder charge amount measuring instrument, TB-200 produced by Toshiba Chemical Co., Ltd. was used, F963-2535 available from Powder TEC Co., Ltd. was employed as the same kind of carriers, and a specific gravity of the particle substance constituting the liquid powder was measured by a multi-volume density meter H1305 produced by Shimadzu Corporation. Then, the charge density per unit surface area (unit: $\mu C/m^2$) was calculated. Specifically, the average particle diameter was measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory). A specific gravity was measured by using a multi-volume density meter H1305 produced by Shimadzu Corporation.

Moreover, the image display panel of a mono color was manufactured by using the black particles having a positive charge characteristic according to the examples 101–103 and the comparative example 101 together with the white particles ($TiO_2$ was used as the pigment) having a negative charge characteristic. With respect to the thus manufactured image display panel, a voltage of 150 V was applied between the electrodes and display colors were inverted, so that a white reflectance and a black reflectance were measured by using a liquid-crystal system of reflection type produced by minolta. Then, a contrast was measured from the results. The results were shown in the following Table 10. In the Table 10, as a display performance decision, a symbol ○ showed a contrast not less than 1.0 and a symbol X showed a contrast less than 1.0.

display device was manufactured by using the image display media utilizing the particles mentioned above, a high inversion performance was achieved.

INDUSTRIALLY APPLICABILITY

As is clearly understood from the above explanations, according to the first aspect of the invention, since the white particle comprises a center portion and an outer portion coating the center portion, wherein the center portion has a total reflectance of not less that 70% at a boundary between the center portion and the outer portion, and, wherein the outer portion is formed by at least one resin layer, in which fine particles made of a high reflectance material are mixed with a low reflectance material, the white particles have the center portion showing a high total reflection rate, and thus it is possible to improve a luminance factor of the white color. The same effects can be obtained in the white liquid powder utilizing the white particles according to the first aspect of the invention.

As is clearly understood from the above explanations, according to the second aspect of the invention, since use is made of the image display panel in which three groups of the particles produced by adding the third particles to the two groups of the substantially circular particles having different charge characteristics are sealed between two substrates, the particles become difficult to be agglutinated and adhered with each other and it is possible to improve a durability of the image display.

As is clearly understood from the above explanations, according to the third aspect of the invention, since the particles are made of a low dielectric insulation material having preferably a specific inductive capacity $\in_r$ of $\in_r \leq 5.0$, it is possible to prevent the particle agglutination even if the particles have the same charge characteristic, and thus it is possible to perform an excellent image display.

As is clearly understood from the above explanations, according to the fourth aspect of the invention, since the white pigment preferably titanium oxide, whose surface is coated by a binder, is agglutinated or granulated and a

TABLE 10

|  | Example 101 | Example 102 | Example 103 | Comparative Example 101 |
|---|---|---|---|---|
| Base resin | PBT (99 wt %) | PBT (90 wt %) | PBT (85 wt %) | PBT (95 wt %) |
| Metal oxide | MgO (5 wt %) |  | MgO (5 wt %) |  |
| Fatty acid metal salt |  | magnesium stearate (5 wt %) | magnesium stearate (5 wt %) |  |
| Pigment | C/B (5 wt %) | C/B (5 wt %) | C/B (5 wt %) | C/B (5 wt %) |
| Mixing temperature (° C.) | 240 | 240 | 240 | 240 |
| Particle diameter (μm) | 10 | 10 | 10 | 10 |
| Charge amount ($\mu C/m^2$) | +55.3 | +40.2 | +84.8 | +7.1 |
| Repetition experiment contrast | 1.2 | 1.2 | 1.3 | 0.4 |
| Display performance decision | ○ | ○ | ○ | X |

From the results shown in Table 10, it is understood that the examples 101 and 103 in which metal oxide was mixed and the example 102 in which fatty acid metal salt was mixed had a large charge amount as compared with the comparative example 101 in which no metal oxide and no fatty acid metal salt were mixed, and, as a result, if the image plurality of fine bubbles are introduced therein, it is possible to improve extremely the opacifying rate (reflection rate).

As is clearly understood from the above explanations, according to the fifth aspect of the invention, one particles used for two groups of the image display media having different charge characteristics are formed by particles having a surface on which macroscopic concavo-convex portion exists (for example, crushed particles), and the other particles are formed by particles having a surface on which no macroscopic concavo-convex portion exists, so that the surface states of the particles used for two groups of the image display media are made to be different (first embodiment). Moreover, one particles used for two groups of the image display media having different charge characteristics are formed by particles having a surface on which macroscopic concavo-convex portion exists (for example, crushed particles), and the other particles are formed by particles having a surface on which no macroscopic concavo-convex portion exists. In addition, the fine particles as a third particles having a charge characteristic different from that of the particles, on which no macroscopic concavo-convex portion exists, are adhered in an electrostatic manner to the surface of the substantially circular particles on which no macroscopic concavo-convex portion exists (second embodiment). Therefore, the particles having different charge characteristics become difficult to be agglutinated and adhered with each other, and thus a durability of the image display can be improved.

As is clearly understood from the above explanations, according to the sixth aspect of the invention, since the white pigment and the hollow particles are filled in the base resin, it is possible to improve a whiteness (white reflection factor) of the white particles by means of an opacifying effect of the hollow particles.

As is clearly understood from the above explanations, according to the seventh aspect of the invention, since use is made of the thermosetting resin as the base resin of the particles constituting the image display media, to which a cross-linking reaction is performed, it is possible to improve the heat resistance. As a result, the adhesion/agglutination with respect to the image display panel does not occur.

As is clearly understood from the above explanations, according to the eighth aspect of the invention, since the particle shape of at least one of two groups of the particles having different charge characteristics and different optical reflectance, which are included in at least two groups of the image display media, is a flat round shape, the particles are easily aligned when the particles are moved and aligned on a display surface. Moreover, since a packing of the particles can be made dense, it is possible to improve a contrast of the image. In addition, in the case such that the particle shape of at least one of two groups of the particles having different charge characteristics and different optical reflectance, which are included in at least two groups of the image display media, is a flat round shape, the particles become hard to be agglutinated and adhered with each other, and particle clashes can be reduced when the particles are moved, so that it is possible to improve a durability of the image display.

As is clearly understood from the above explanations, according to the ninth aspect of the invention, since a relation of particle diameters between two groups of the particles having different colors and different charge characteristics contained in the image display media (deep dark color particles and pale bright color particles) is indicated as Ddark<Dbright, when it is assumed that an average particle diameter of the deep dark color particles is Ddark and an average particle diameter of the pale bright color particles is Dbright, in the case that the particles are aligned on a display surface by moving in reverse directions with each other according to an electrostatic filed direction between the substrates, it is possible to improve a contrast as compared with the case such that the relation of particle diameters is reversed.

As is clearly understood from the above explanations, according to the tenth aspect of the invention, since metal oxide (MOx: here, M; metal element, O; oxygen, x; O/M ratio) is added in a base resin of the particles constituting the image display media or since fatty acid metal salt compound ((CmHnCOO)yMz: here, M; metal element, m, n, y, z; integer, 4<m<22) is added in a base resin of the particles constituting the image display media, a charge property can be controlled if an atmosphere between the substrates in which the image display media utilizing the particles are sealed is a dry state.

The image display device according to the first to the tenth aspects of the invention is applicable to the image display unit for mobile equipment such as notebook personal computers, PDAs, cellular phones and so on; to the electric paper for electric book, electric newspaper and so on; to the bulletin boards such as signboards, posters, blackboards and so on; to the image display unit for electric calculator, home electric application products, auto supplies and so on; to the card display unit for point card, IC card and so on; and to the display unit for electric POP, electric advertisement, electric price tag, electric musical score, RF-ID device and so on.

The invention claimed is:

1. Particles used for image display media in an image display panel, comprising at least two groups of the image display media sealed between opposed substrates, at least one of two substrates being transparent, and in which the image display media, to which an electrostatic field generated between two electrodes having different potentials is applied, are made to move so as to display an image, wherein one of the two groups of the particles having different charge characteristics and different optical reflectance included in the at least two groups of the image display media has a surface on which a macroscopic concavo-convex portion exists, and the other of the two groups of the particles has a surface on which no macroscopic concavo-convex portion exists and on which fine particles are adhered in an electrostatic manner; and wherein, among the two groups of the particles having different charge characteristics and different reflectance, the fine particles adhered to the surface of the particles, on which no macroscopic concavo-convex portion exists, have a reverse charge polarity with respect to a charge polarity of the particles having the surface, on which no macroscopic concavo-convex portion exists, and, the fine particles do not change a charge polarity of the particles having the surface, on which no macroscopic concavo-convex portion exists, after being adhered.

2. The particles used for the image display media according to claim 1, wherein, among the two groups of the particles having different charge characteristics and different optical reflectance, the particles having the surface, on which the macroscopic concavo-convex portion exists, are obtained by crushing a resin agglomerate.

3. The particles used for the image display media according to claim 1, wherein, among the two groups of the particles having different charge characteristics and different optical reflectance, the particles having the surface, on which the macroscopic concavo-convex portion exists, are obtained by firmly adhering fine particles on a surface of mother particles.

4. The particles used for the image display media according to claim 3, wherein the adhering between the mother particles and the fine particles is performed by utilizing a mechanical impact strength.

5. The particles used for the image display media according to claim 1, wherein, among the two groups of the particles having different charge characteristics and different optical reflectance, the particles having the surface, on which no macroscopic concavo-convex portion exists, are substantially circular particles obtained by polymerizing a resin monomer.

6. The particles used for the image display media according to claim 1, wherein, among the two groups of the particles having different charge characteristics and different optical reflectance, the particles having the surface, on which no macroscopic concavo-convex portion exists, are substantially circular particles obtained by smoothing the surface under such a condition that crushed particles are exposed at a temperature higher than a melting point of the particles.

7. The particles used for the image display media according to claim 1, wherein an average particle diameter of the two groups of the particles having different charge characteristics and different optical reflectance is 0.5–50 µm.

8. The particles used for the image display media according to claim 6, wherein an average particle diameter of the fine particles adhered in an electrostatic manner to the surface of the particles, on which no concavo-convex portion exists, is 20–200 nm.

9. An image display panel comprising the image display media utilizing the particles set forth in claim 1, wherein a volume occupying rate of the at least two groups of the image display media tilled between the substrates is in a range of 5–70 vol %.

10. An image display device comprising the image display panel set forth in claim 9.

11. The particles used for the image display media according to claim 1, wherein an average particle diameter of the fine particles adhered in an electrostatic manner to the surface of the particles on which no concavo-convex portion exists, is 20–200 nm.

* * * * *